United States Patent [19]

Yin et al.

[11] Patent Number: 4,980,840

[45] Date of Patent: Dec. 25, 1990

[54] COMPUTERIZED EDITING AND COMPOSING SYSTEM

[75] Inventors: Bujiu Yin; Yiming Zhou; Yilin Chen, all of Beijing, China

[73] Assignee: Beijing Stone New Technology Research Institute, Beijing, China

[21] Appl. No.: 244,012

[22] Filed: Sep. 14, 1988

[30] Foreign Application Priority Data

Sep. 23, 1987 [CN] China .............................. 87106484

[51] Int. Cl.$^5$ .......................................... G06F 15/20
[52] U.S. Cl. .................................. 364/518; 340/730; 364/523
[58] Field of Search ................. 364/518–523; 382/44–48; 340/723, 724, 729–731, 734, 735

[56] References Cited

U.S. PATENT DOCUMENTS

| | | | |
|---|---|---|---|
| 4,075,695 | 2/1978 | Lelke | 364/200 |
| 4,247,906 | 1/1981 | Corwin et al. | 364/900 |
| 4,464,730 | 8/1984 | Lawrence et al. | 364/900 |
| 4,498,147 | 2/1985 | Agnew et al. | 364/900 |
| 4,648,047 | 3/1987 | Berkland et al. | 364/519 |
| 4,737,923 | 4/1988 | Matsuzaki et al. | 364/519 |
| 4,755,955 | 7/1988 | Kimura et al. | 364/518 |
| 4,802,104 | 1/1989 | Ogiso | 364/518 |

FOREIGN PATENT DOCUMENTS 0173124 of 1986 European Pat. Off. .
0173125 of 1986 European Pat. Off. .

Primary Examiner—Dale M. Shaw
Assistant Examiner—H. R. Herndon
Attorney, Agent, or Firm—Nixon & Vanderhye

[57] ABSTRACT

A computerized editing and composing system and method which conveniently and directly edits and composes complex scientific formulas, chemical structural formulas and music staves. The system comprises a computer, an I/O interface, an input device, a character library and character generating system, a display, an editing and composing process device and peripheral devices, and automatically processes the corresponding text while providing the user with a simple and convenient operational interface with inputting, editing, composing and outputting techniques to generate the different resolutions of the output.

17 Claims, 39 Drawing Sheets

ASCII CODE – MATH. SYMBOL TABLE

| | 2 | | 3 | | 4 | | 5 | | 6 | | 7 | |
|---|---|---|---|---|---|---|---|---|---|---|---|---|
| 0 | | | 0 | ○ | @ | ∝ | P | Π | ` | ∥ | p | π |
| 1 | ! | ≠ | 1 | ≃ | A | ⇌ | Q | ⊃ | a | α | q | ψ |
| 2 | " | ≑ | 2 | † | B | × | R | ⊂ | b | β | r | ρ |
| 3 | # | ¢ | 3 | ‡ | C | Ξ | S | Σ | c | ζ | s | σ |
| 4 | $ | ∈ | 4 | $ | D | Δ | T | | d | δ | t | τ |
| 5 | % | ∞ | 5 | £ | E | ∇ | U | ∪ | e | ε | u | ∪ |
| 6 | & | □ | 6 | ≪ | F | Φ | V | ∩ | f | φ | v | ∩ |
| 7 | ' | ⇒ | 7 | ≫ | G | Γ | W | Ω | g | γ | w | ω |
| 8 | ( | ) | 8 | | H | Θ | X | Ψ | h | θ | x | χ |
| 9 | ) | | 9 | ∂ | I | ∫ | Y | Σ | i | ∫ | y | η |
| A | * | ∴ | : | ⟦ | J | √ | Z | Π | j | √ | z | ζ |
| B | + | ± | ; | ⟧ | K | | [ | ⌈ | k | κ | { | { |
| C | , | ⋮ | < | ≤ | L | Λ | \ | \ | l | λ | \| | |
| D | − | ← | = | | M | ≧ | ] | ⌋ | m | μ | } | } |
| E | . | ⋯ | > | ≥ | N | ≦ | ^ | ↓ | n | ν | ~ | |
| F | / | / | ? | ≈ | O | ≁ | − | → | o | ≮ | | |

Fig. 3

| Input | Display | Comment |
|---|---|---|
| Integral | $\int$ | $\int$ appears on the screen, and set subscript size and co-ordinates. |
| From 'a' | $\int_a$ | input subscript |
| To | $\int_a$ | switch to superscript position |
| 'b' | $\int_a^b$ | input superscript |
| Recover | $\int_a^b$ | recover to text position |
| 'x' | $\int_a^b x$ | input 'x' |
| 'dx' | $\int_a^b x\,dx$ | input 'dx' |

Fig. 19

THE COMPARISON TABLE OF THE PRESENT INVENTION AND OTHER SYSTEM

| | COMPANY | Stone Corp. China | Bell labs. U.S.A | Stanford University U.S.A | Monotype Corp. U.K. | Kabushiki Kaisa Japan | Beijing University China | Printing Institute China |
|---|---|---|---|---|---|---|---|---|
| | SYSTEM | SSSS | MES, MS NNOFF TNOFF | TEX | KEY-STORE | Chemical Structural Processing | TTS | Ke Yin |
| F U N C T I O N | Chemistry | O | × | × | × | O | O | × |
| | Math. | O | O | O | O | × | O | O |
| | Chinese | O | × | × | × | × | O | O |
| | English | O | O | O | O | O | O | O |
| | Mixed Setting | O | × | × | × | O | O | O |
| | Vertical Setting | O | × | × | × | O | × | O |
| | Pieced Graphic | O | × | × | × | × | × | × |
| | Word Separation | O | × | O | O | O | O | × |
| | Descriptive Command | × | O | O | O | ×O | O | O |
| | Graphic Operation | O | × | × | × | ×O | × | × |
| | Visualness | O | × | ×O | × | ×O | × | × |
| | Convenience | O | × | ×O | × | ×O | × | × |
| | What You See is What You Get | O | × | × | × | ×O | × | × |
| O U T P U T | Monitor | O | O | ×O | O | O | × | ×O |
| | Printer | O | O | O | × | × | × | ×O |
| | Laser Printer | O | × | O | O | O | ×O | × |
| | Laser Typesetter | O | ×O | O | O | O | × | O |
| | Layout-Output Consistence | O | × | O | × | × | × | O |

O    Have the function
×    Doesn't have the function
×O   The function is weak

Fig. 34

COMPUTERIZED EDITING AND COMPOSING SYSTEM

BACKGROUND AND SUMMARY OF THE INVENTION

This invention relates to a computerized editing and composing system and a method of the same; and, more particularly, to a system and a method of editing and composing for literature, scientific documents, text books and magazines, etc.

In scientific and technical press works mentioned above, there are a great deal of complicated mathematical, physical and chemical formulas and chemical structural formulas involved. It is very difficult and inefficient to set those formulas with the conventional stereotype. A skilled compositor can only set three to four plates for those complicated scientific press works and the comprehensive efficiency therefore is only one to two layouts of printed sheet. With three times of proofing and modification of the press, the publishing cycle is so long that the publication of scientific and technical press works becomes a serious problem.

Effort has been made to shorten the publishing cycle by experts both in China and the world. For instance, Mathematical Editing System (MES), NROFF and TROFF, by Bell Labs., UK; TEX system by Prof. Knoth, Stanford University, U.S.A.; Keystore system, Monotype Corp., UK; Computer Processing System for Chemical Structural Formula, Kabushiki Kaisha, Japan; TTS system, by Zheng Min et al., Beijing University, P.R. China; Hua Wei system and Ke Yin system based on Hua Wei system, by Yin Bujiu et al, the applicants of the present invention, China Printing Research Institute, P.R. China.

Most of the methods adopted by the above systems are descriptive commands or semi-descriptive commands; i.e., the complex formulas are accomplished by the commands in which formula position, character size, character style, formula structures and formula relations are defined by special symbol-control codes. Hence, the operating is still not visual and modifying is difficult. By using descriptive commands, modification is done by batch processing. For instance, let's try to input the following multi-layer continued fraction expression:

$$\cfrac{1}{1+\cfrac{1}{1+\cfrac{1}{1+\cfrac{1}{1+\cfrac{1}{x}}}}}$$

For each layer, you must define the beginning of the fraction; then, the numerators and the denominators; finally, the end of the fraction. If the mathematical symbols, such as superscript, subscript and integral, are contained in the numerators or denominators, you must also define where to start the integral and its upper and lower limits, and the end of the integral. An operator has to face such a situation in which he is unable to see the output effect from the screen when he is writing scientific formulas to the system. When a modification must be made, the operator has to find where the control code is from the descriptive command which causes the mistake. It is very hard and tedious work.

Another system of the prior art is called the Image Processing System (IPS); a patent application was filed with Europe Patent Organization on Nov. 14, 1985 (the date of priority is Nov. 14, 1984) by Canon Corp., Japan. Page design is supported by the formal file library, and the layout of the page is displayed on the screen by graphics. IPS is designed to process Japanese, English and graphics, with no concern for scientific setting functions.

As far as scientific composition is concerned, the key problem is complex mathematical and chemical structural formulas. Nevertheless, as far as complex mathematical and chemical formulas are concerned, the key features are the varieties of the formats and the frequent change of character style and character size as well as large-scale position changes on screens. It differs from text composition in line-alignment and column-alignment. If those formulas are expressed by descriptive commands, a great number of descriptive commands and parameters must be used. Therefore, the problems mentioned above are unavoidable. If interactive batch processing is used, it would produce the following shortcoming operations are complicated and not visual, mistakes are easily made and they are hard to correct.

A first object of the present invention is to provide a computerized scientific publishing system with application and methods by which the operator can compose text, scientific formulas, chemical structural formulas and music staves, etc., which are displayed on the screen with flexibility and convenience.

A further object of the present invention is to provide not only front-end processing for a laser compositor, but also a computerized scientific publishing system.

A further object of the present invention is to provide a computerized publishing system which integrates the functions of writing, editing, typesetting, illustration and page design.

A further object of the present invention is to provide a computerized scientific publishing system which can produce the output in different resolutions for different users consistent with output formats.

The invention also provides a simple, convenient environment in which the operator can immediately see the effect on the screen when any operational step is made.

A further object of the present invention is to provide a computerized publishing system and its method by which the operator works with a graphic operating interface. The text processing is automatically and simultaneously accomplished by the system according to the user's operations.

In comparison with the prior art, the present invention has the following features:

The invention provides a simple, visual, convenient operating interface between the operator and the system. The feature known as "What You See Is What You Get" is applied for text, scientific formulas and chemical structural formulas, etc.

The composing operation of complicated scientific formulas, according to the present invention, is greatly simplified. It is easy to input, to set and to modify. The efficiency of scientific publishing is greatly increased.

In accordance with the system and the method of the present invention, conventional printing techniques and equipment can be partially or completely replaced by the present invention. The working environment can be improved, and the labor and energy can be saved.

In accordance with the system and the method of the present invention, graphics can be accomplished by the functions of drag (drag down to desired shape by the Mouse), move, copy, continuous zoom (zoom-in and zoom-out). Those functions are flexible and practical.

In accordance with the system and the method of the present invention, text editing functions of addition, deletion, modification, and insertion can be combined with move, copy, zoom, overlap, multi-layer display, color processing, window technique, etc., providing an abundant, convenient way to modify text for the operator.

The system and the method of the present invention enable research institutes, colleges, publishers and even individuals to do composing work.

The system of the present invention is equipped with the Mouse. Position can be accurately set by using cursor movement keys and red-cross indicator. The technique results in the effect of "What You See Is What You Get".

The system and the method of the present invention have high resolution display, multiple English character styles, mathematical symbols display, and the Chinese character styles of Song, imitated Song, black and regular script as well as Chinese characters from 1 to 100 points.

The system of the present invention adopts the input method of Chinese, English, scientific symbols, including the characters and symbols in the first and second level of the International Chinese Standard Code, 94 basic characters in ASCII code, mathematical symbols, complicated mathematical formulas, chemical molecular and structural formulas (e.g., benzene ring), graphics and tables, etc.

The system and method of the present invention provide not only the basic editing functions of addition, deletion, insertion, and modification, but also special editing functions, such as, conversion of character style, zoom-in and zoom-out functions for character and page, graphic duplication and graphic move.

In accordance with the system and method of the present invention, books on the theory of literature and art, scientific documents, newspapers and magazines with pictures can be produced.

The system and method of the present invention can mix typesetting of different character size and different languages; center text with left alignment, right alignment, or equal spacing; punctuate logically in the beginning or at the end of a line, separate English syllables with automatic soft hyphens, process multi-columns and set horizontal and vertical and arbitrary across-transferring processing.

The system and method of the present invention can perform Tri-layer setting operations. The method is visual and simple, and is easy to learn and understand. Users can freely perform complicated mathematical formulas, such as multi-layer summation, multi-layer integral, multi-layer limit, multi-layer product, multi-layer superscript, multi-layer subscript, multi-layer root expression, multi-layer fraction expression, vector expression and matrix expression, etc.

In accordance with the system and method of the present invention, the setting of chemical structural formulas is performed by means of the graphic function and several other techniques so that difficult problems, such as drawing a benzene ring, are solved.

In accordance with the system and method of the present invention, the layout of press works on the screen can be modified at any time. Where you point is where you modify. The conventional method of modifying function is totally changed.

In order to clearly illustrate the differences between the prior techniques and the present invention, FIG. 34 is provided for comparison. The Super Science Setting System (4S) in FIG. 34 is an embodied system of the present invention. The 4S includes:

Input device for inputting characters and commands;
Computer unit for controlling the operations;
Display device for displaying the layout of printing in real-time;
Character generating system and character library for accommodating characters to the system; and
An Input/Output interface device.

An editing and composing processing device, including input module, editing module, setting module, display module and setting rule library; the input device receiving the characters and commands from the I/0 interface; the received characters, accommodated by the character library, are manipulated under the control of the computer unit.

A driving module is used to convert the output according to the requirements of different peripheral devices, and send them to the peripheral devices; the output is printed out, under the control of an internal control unit, by peripheral devices with different resolutions.

The editing and composing processing devices mentioned above further includes:

Input module for decoding the characters and commands inputted from the input device;
Display module for retrieving the characters from the character generating system and character library and displaying them according to the output of the input module;
Editing module for carrying out real-time editing processing of displayed contents under the control of the decoded commands from the input module; and
Setting module for carrying out real-time setting processing of characters and graphics inputted from the input device under the control of the decoded commands of the input module and the support of setting rule library.

The input module mentioned above further includes:
Graphic input submodule used to digitize graphic information which is inputted from input device;
Character input submodule used to select input method for characters;
Position input submodule used to receive the commands controlling the positions of the characters and graphics inputted from input device;
Control command input submodule used to receive the editing, setting and displaying commands inputted from the input device;
Decoding processing module used to receive the output of the submodules mentioned above and then decode them.

The editing module mentioned above further includes:
Several operating submodules used to perform the operation of graphic setting, graphic move, copy, delete, insert, as well as changing character style and size in response to the decoding commands of the decoding process control module;
Several processing submodules used to simultaneously perform the operations of correspondent text registration, deletion and rename in response to the operational results of the operating submodule.

The setting module mentioned above further includes:

Several setting submodules used to perform the operation of scientific formulas, texts, halftone graphics, chemical structural formulas, music staves and drawing, as required by the operator, in response to the decoded commands of the decoding processing module; and Several setting text processing submodules used to simultaneously perform the operations of concerned text registration, deletion and modification in response to the results of the setting submodule.

The text processing submodule and setting text submodule in the editing module and setting module include, respectively, a RAM storing the operational results of the text registration, deletion and modification.

The display module mentioned above further includes:

Halftone graphic display submodule for sending graphic information to graphic display buffers;

Line graphic display submodule for carrying out calculation on line-art, and sending the calculated graphic data to the graphic display buffers;

English character display submodule used to determine the display positions of characters and inquire the status of concerned characters from the character library and then send the character information to the graphic display buffers;

Chinese character display submodule used to assign the display position of character, query the character style and then send character information to the graphic display buffers; and Graphic deletion and zoom processing submodule used to retrieve original graphic data from the graphic display buffers. Then the graphic data are logically calculated, or proportionally reduced or enlarged at user's request, and the processed graphic data are then sent to the graphic display buffers.

In accordance with the present invention, a computerized publishing method comprises the following steps:

Characters and commands are inputted through the input device;

Characters and commands are decoded by editing and setting processing devices and the decoded characters and commands are edited or composed and displayed under the control of commands after being decoded; and The processed results of the editing and composing processing devices are displayed on a monitor in real-time.

The method further comprises the operations of registration, deletion or modification for text record and store the steps of obtaining the operational results.

By using the method, the steps at which the operator set scientific press works by the inputted device include:

A front-setting command for scientific formulas is inputted by the input device;

A switching command is inputted by the input device; and

A rear-setting command for scientific formulas is inputted by the input device.

The method further comprises the following steps:

The front-setting commands for scientific formulas are sequentially inputted by the input device;

The switching commands are sequentially inputted by the input device; and

The rear-setting commands for scientific formulas are sequentially inputted by the input device.

The computerized publishing method mentioned above further comprises the following steps:

Characters are inputted by the input device after the front setting commands of certain scientific formulas have been inputted; and Characters are inputted by the input device after the switching commands have been inputted.

The computerized publishing method further comprises the step that graphics and characters are separately processed in order to display them in different graphic layers.

The computerized publishing method mentioned above further comprises the following steps:

The music staves are processed in one graphic layer, and the notes and marks, etc., are processed in another graphic layer.

The computerized publishing method mentioned above comprises the step where the graphics and characters in the graphic display buffer are retrieved and logically calculated with the original ones; the undesired graphics and characters which are cross overlapped are eliminated.

The computerized publishing method also comprises the step where the names of graphics are stored in a file header—thus, graphics can be processed as characters.

The computerized publishing method further comprises the step where the published object can be processed as characters or graphics depending on the needs.

The computerized publishing method mentioned above comprises the steps of processing the chemical symbols:

A first position is assigned in the graphic interface, a second position is inputted by the input device; and A graphic benzene ring is automatically generated in accordance with the first position and the second position is associated with the hexagonal benzene ring graph.

The computerized publishing method further comprises the following steps:

By setting up the first position of the benzene ring, the shape and the size of the benzene ring can be continuously changed by changing position 2 via the input device; and Deleting the previous graphic of the benzene ring, a new graphic is generated according to the current position.

The objectives, effects and advantages of the system and method in accordance with the present invention are illustrated more clearly with the figures as follows.

BRIEF DESCRIPTION OF THE DRAWINGS

FIG. 3 shows ASCII code for mathematical symbols.

FIG. 19 is a flowchart in detail for the tri-layer scientific formula setting operation.

FIG. 34 shows a comparison between the prior techniques and the present invention.

Detailed Description of the Preferred Embodiments

Figure 1:
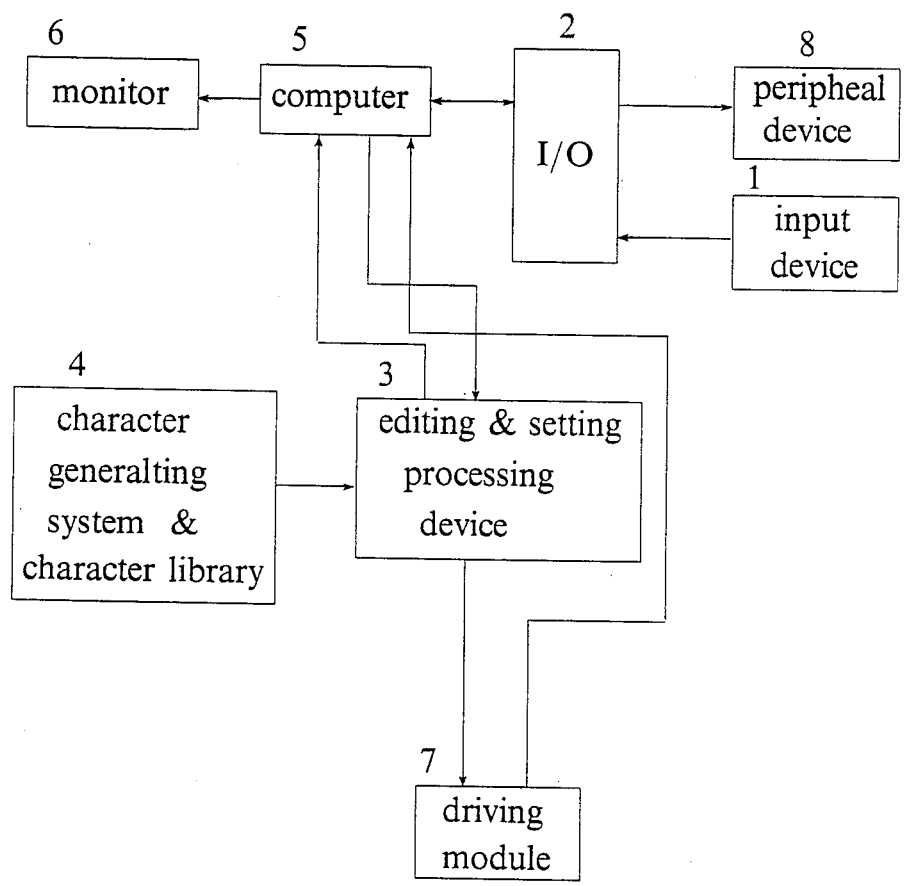
FIG. 1 is a flowchart of the computerized scientific publishing system in accordance with the present invention.

FIG. 1 is a schematic diagram of the computerized editing and composing system of the present invention. The principle and procedure of the computerized editing and setting system shown in FIG. 1 are illustrated as follows: First, the user inputs the contents needed to be edited and composed, such as texts, scientific formulas, chemical formulas and symbols, as well as a few control commands, to editing and composing processor 3 with input device 1, such as a keyboard, via I/0 interface 2. The contents are then edited and composed by processor 3 under the control of computer 5; at the same time, the layout is displayed on monitor 6. The user then can modify, delete, change the character style and size, zoom-in or zoom-out the layout on monitor 6. The final display of the layout is the one to be printed out. The output is used for plate making. After the contents and format have been determined on monitor 6, the editing and composing processor 3 under the control of an input command applied to the input device generates a signal to driving module 7 under the control of the input device. Then computer 5 drives peripheral device, such as a line printer, laser printer laser typesetter, etc., under the control of driver module 7 via I/0 interface 2. When the editing and composing processor 3 processes Chinese texts, the characters are retrieved from the character generating system and character library 4. When the desired characters are not found in the character library, the character generating system will make them on demand. The character library provides four Chinese character styles, nine English character styles, a set of mathematical symbols and a set of decorative borders.

Figure 2A:
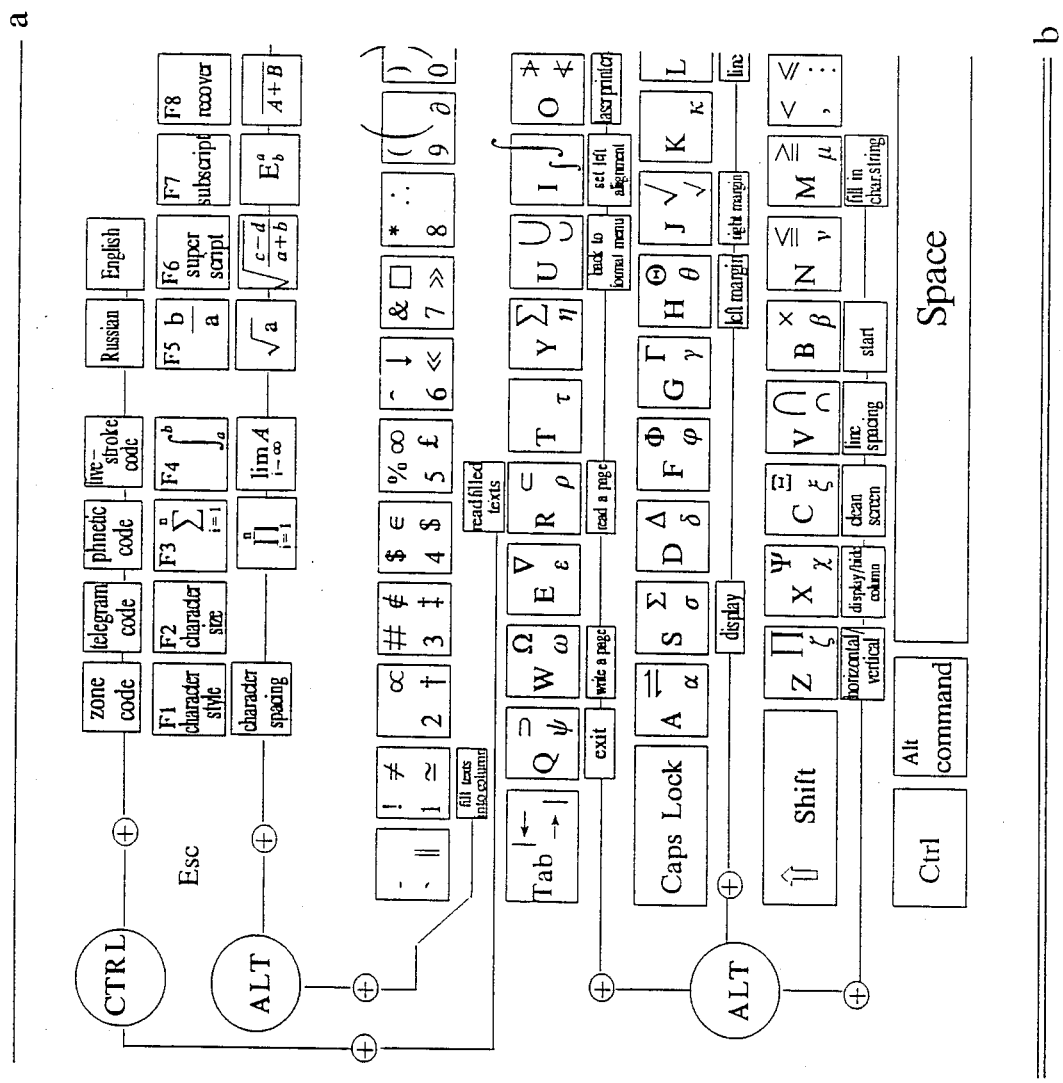
FIG. 2 is a keyboard layout for input device 1 in FIG. 1.
Figure 2B:
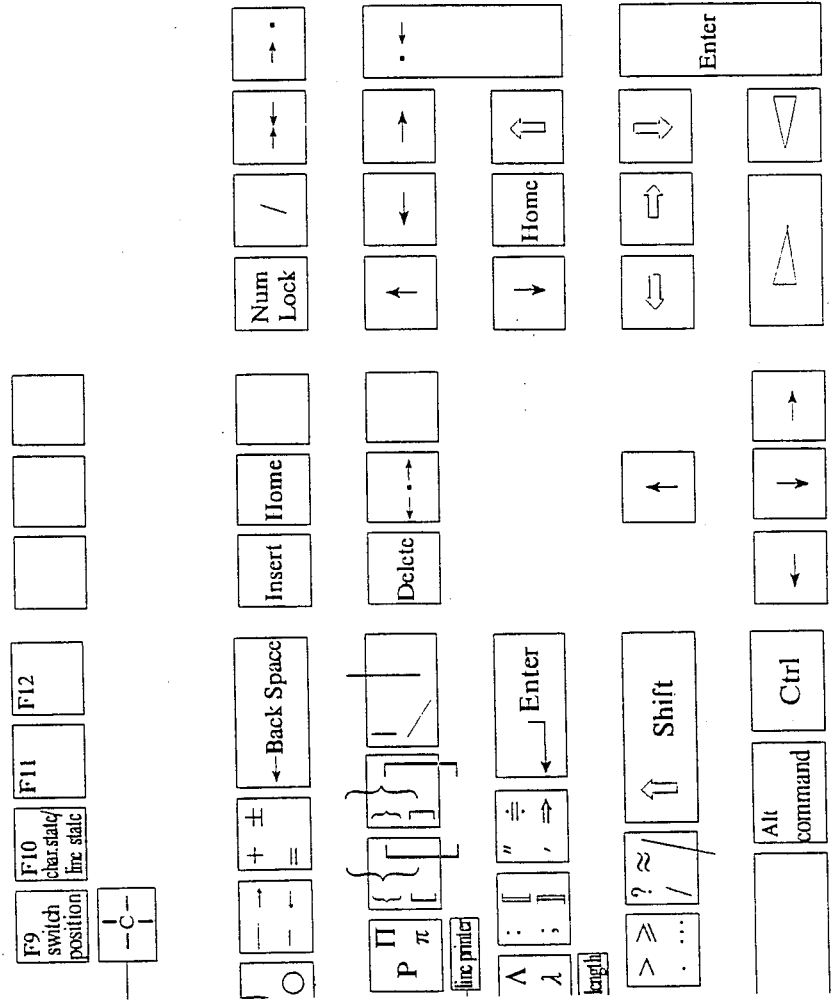

As shown in FIG. 2, the layout of a keyboard included by input device 1 consists of the following elements:

1. 94 ASCII codes, including all English characters (A-Z, a-z) and numbers (0-9) as well as associated symbols, such as '!, . ' and '. ', provided by the original keyboard configuration.

2. 94 Greek characters and mathematical symbols are inputted by pressing "" key with an ASCII code as shown in FIG. 3.

3. The control key (CTRL) is used to select a Chinese input method associated with function keys from F1 to F4 providing zone code, telegram code, Chinese phonetic code and five stroke code, respectively.

In zone code and telegram code, the external code consisting of 4 digits from 1 to 9 are converted to 2-byte Chinese internal code through calculation and checking a table.

In Chinese phonetic code and five stroke code, the 26 small letters (a-z) are used as external code and converted to Chinese internal code through checking a table.

4. As shown in FIG. 2, the four keys "→ Y ↑ ↓" are respectively the character pointer control keys to allocate a particular position, i.e., to point to a left, right character or to point to the preceding or succeeding line.

Also, "→ ← ↑ ↓" are four cursor position keys to move the cursor in a two-dimensional plane with the scale of one-half character, one-half line, dot-by-dot and line-by-line.

are line setting command keys performing left alignment, right alignment, center and equal spacing functions.

keys can be used to arbitrarily change the character size.

Insert key (INS) is used to insert characters in a line, and delete key (DEL) is used to delete a string of characters.

5. F11, F15 and SHIFT+(F1–F15) represent the functions of summation, products, integral, limit, superscript, subscript, square root, fraction, super-high root carbon train and vector.

F9 is a command key for switching from one portion of an expression to another portion of the expression when setting a scientific formula.

F8 is a command key to end scientific formula setting and recover to the text setting from setting a scientific formula.

F6 and F7 are command keys for superscript and subscript, respectively.

6. COMMAND key (ALT) with typewriter key—B, L, D, G, M, V and Z represent the start of composition, column width, column high, column spacing, the number of columns, line spacing, horizontal setting and vertical setting.

7. F1 with numeric keys (0–9) is used to change character style, F2 with numeric keys (0–9) is used to change character size.

FIG. 3 is an ASCII code table for mathematical symbols.

Figure 4:
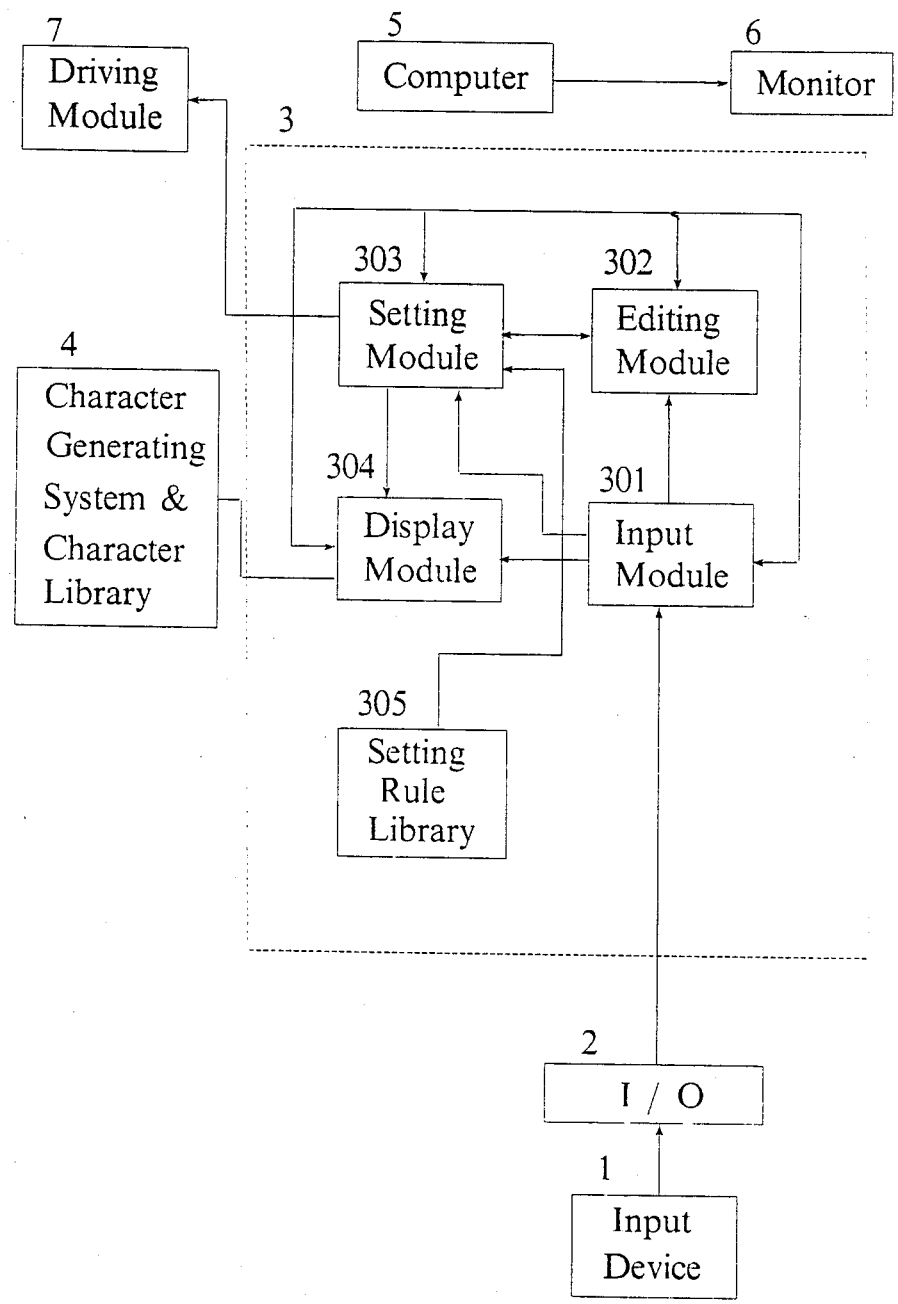
FIG. 4 is a detailed structural diagram for the editing and composing processing device in FIG. 1.

FIG. 4 is a detailed structural figure of editing and setting processor 3 in FIG. 1. Input module 301 is used to decode characters, graphics and commands via input device 1 and I/0 interface 2. Different objects are distinguished according to different needs, and the output of input module 301 then will be sent to editing module 302, display module 304 and setting module 303. Display module 304 retrieves Chinese characters from character generating system and character library 4 according to the processed result of input module 301, and then displays them on monitor 6. Meanwhile, editing module 302 can perform insertion, deletion, move, enlargement and reduction functions, etc., under the control of input device 1 in real-time. The processed results are displayed on monitor 6 by display module 304. Setting module 303 sets up the format of layout according to the decoded output of input module 301 and inquires about the rules and requirements from setting rule library 305. The layout then is processed by display module 304 and displayed by monitor 6.

Figure 5A:
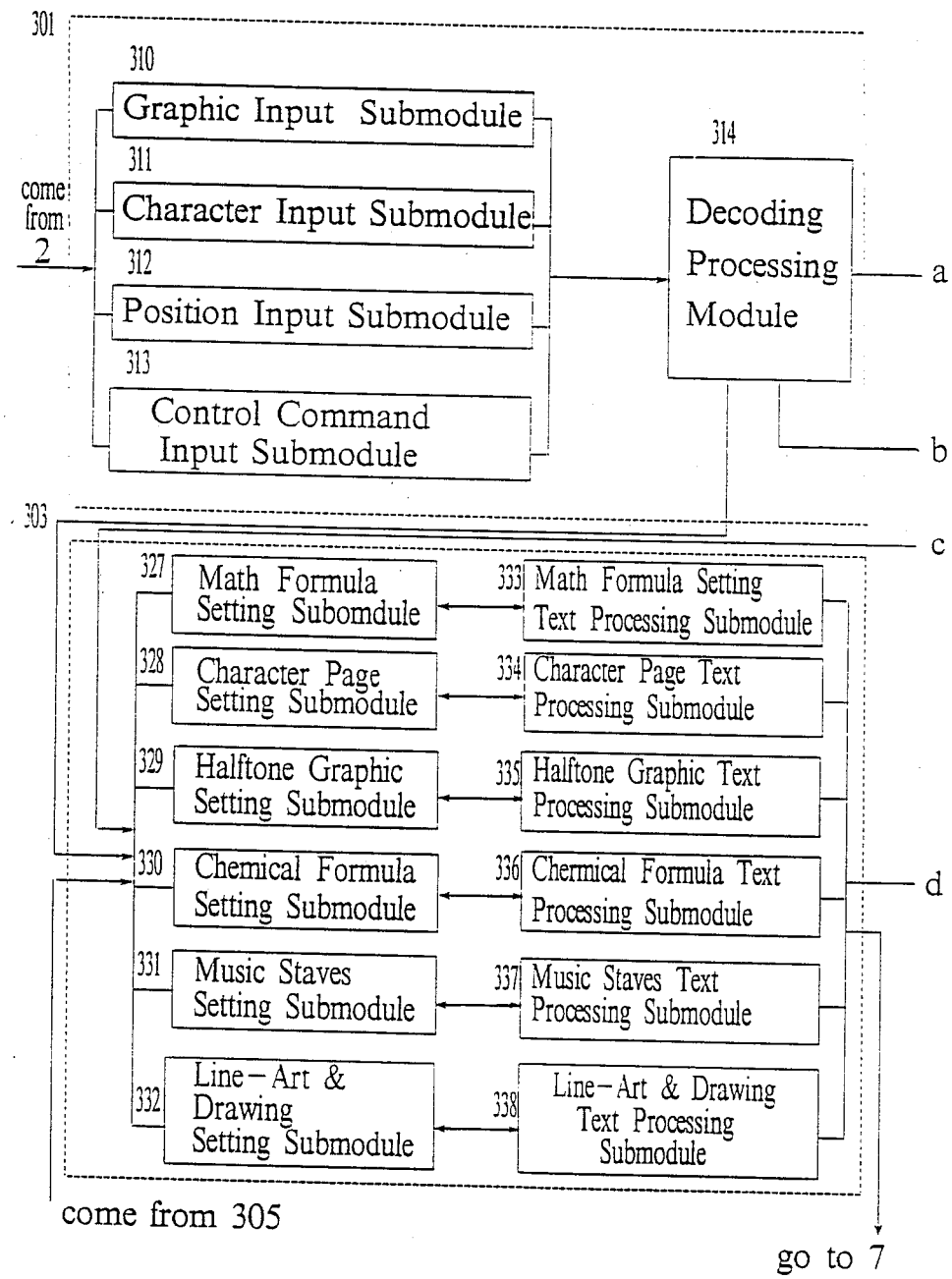
FIG. 5 is a flowchart showing input module 301, editing module 302, setting module 303 and display module 304 in FIG. 4.
Figure 5B:
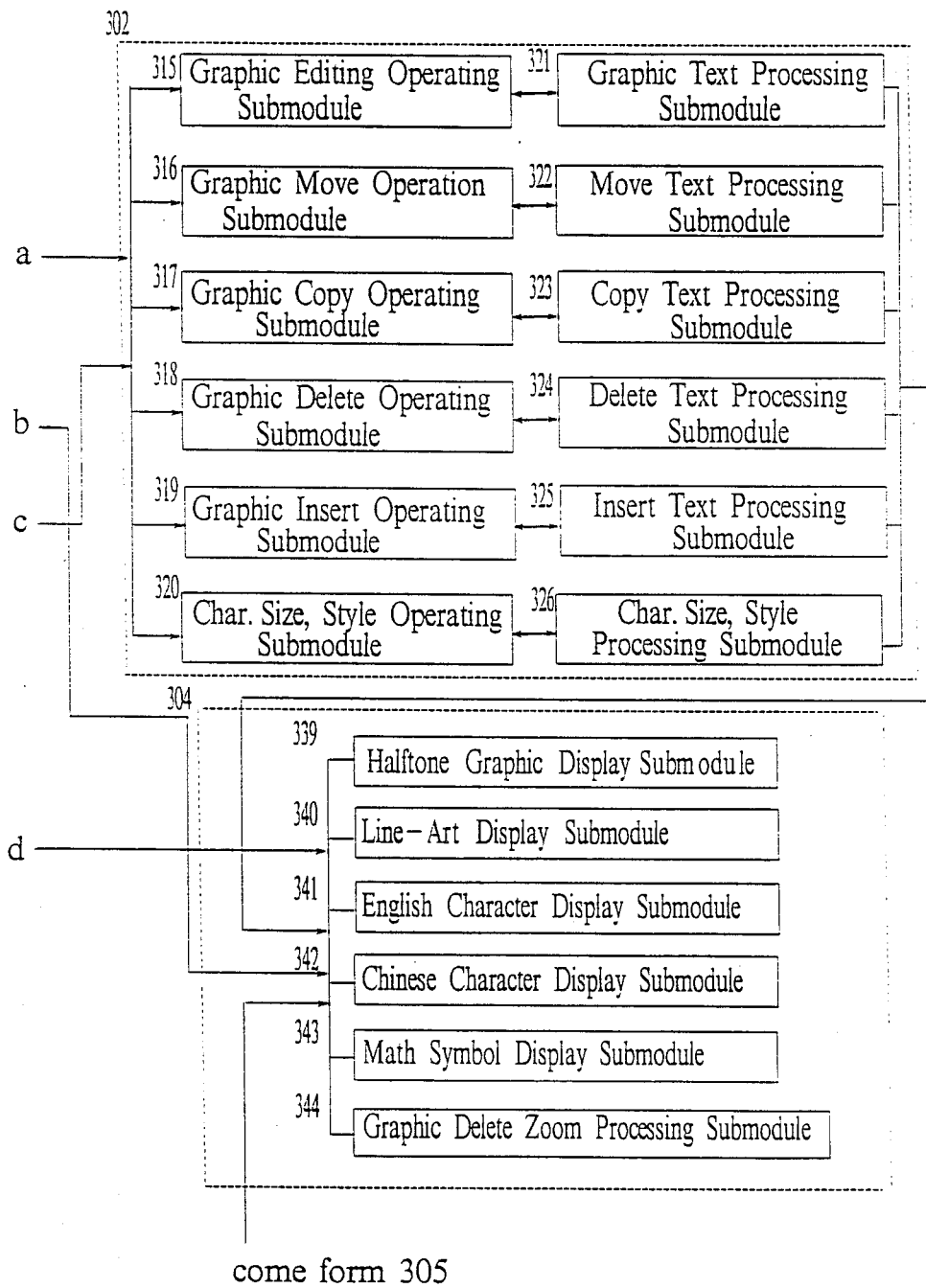

FIG. 5 shows the flowchart of input module 301, editing module 302, setting module 303 and display module 304. Among them, input module 301 consists of graphic input submodule 310, character input submodule 311, position input submodule 312, control command input submodule 313 and decoding module 314. The scanned graphic signals inputted via I/0 interface 2 are digitalized and stored by graphic input submodule 310. The code inputted by keyboard via I/0 interface is received and stored by character input submodule 311. Position input submodule 312 can receive the input from keyboard, mouse, light-pen or similar input device, graphic input board and joy stick via I/0 interface 2, and hence acquire the positional data of the current operating point (two dimensional coordinates). Control command input submodule 313 can also receive the commands and parameters from keyboard, mouse and light-pen which are used to control the setting process via I/0 interface; in the decoding processing module the contents of graphic input submodule 310 and character input submodule 311 are processed and converted to internal data code and format, the control commands of position input submodule 312 and control command input submodule 313 are interpreted in order to control the internal code and different layout format. For example, when character input submodule 311 receives and stores characters inputted with five-stroke method, decoding processing control module 314 is controlled by control command of input device 1 (such as a keyboard), and converts external code received by character input submodule 313 to internal code according to the rules of five-stroke method. Furthermore, external code and formats received by decoding processing module 314 are sent to display module 304 and the drive display submodule to display the corresponding layout on monitor 6. For instance, if Chinese characters are inputted by input device 1 with five-stroke method, the external code of the characters are decoded by decoding processing module and converted to internal code; finally, the characters are displayed by display module 304. However, if what decoding processing module 314 processes is control commands, these commands should be interpreted first, then visually displayed on monitor 6 through editing module 302 or setting module 303 and the associated submodule in display module 304. For example, when decoding processing module 314 receives the commands to change character style from control command input submodule 313, commands must be interpreted first; and then character style is changed by changing character style and size submodule 320 of editing module 302 and character display submodule 342 in display module 304; finally, changed character style is displayed on monitor 6. Similarly, if decoding processing module 314 receives a control command of text setting, the command will be interpreted first, and then processed results will be displayed on monitor 6 by driving text setting submodule 328 of setting module 303 and Chinese character display submodule 342 of display module 304. From FIG. 5, we can see that editing module 302 includes the following: Graphic editing submodule 315; Graphic text processing submodule 321; Graphic move submodule 316; Move function text processing submodule 322; Graphic copy submodule 317; Copy function text processing submodule 323; Graphic deletion submodule 318; Delete function text processing submodule 324; Graphic insertion submodule 319; Insert function text submodule 325; Character style and size changing submodule 320; Character style and size changing processing submodule 326.

When graphic editing submodule 315 is driven by decoding processing module 314, it will perform the operations of delete, zoom, cut, move for graphics by means of graphic editing. Meanwhile, graphic file processing submodule 321 processes graphic file records, for example, by deleting a record of graphic; or, for zoom function, by changing the size of the graphic record; and halftone graphic display submodule 339 of display module 304, driven by graphic editing submodule 315, controls monitor 6 to display in real-time the processing or processed results which are handled by graphic editing submodule 315. In fact, the operator never sees the text processing for graphics; instead, what the operator can see on monitor 5 is the visual operations for graphics. The way that processing is followed by text relieves the operator from tedious and complicated operations and provides a simple, practical and visual environment for the operator. As long as the operator has a basic understanding, he can operate the system immediately.

The operating procedure of the editing module in FIG. 5 is described as follows:

After being processed by decoding processing module 314, editing control command will select and drive one of the submodules in editing module 302 and the selected submodule will perform editing operation by means of graphic editing technique according to the editing control command. In the meantime, the corresponding text processing submodules (321-326) will synchronously revise the record text which consists of 10 parameters and 16 states (the contents of parameters and states in text processing submodules will be described in the next section). The decoding processing module 314 drives the selected submodule in display module 304; thus, the operation and the operational results of the operating submodule will be displayed on monitor 6 in real-time. Under the control of the control command of decoding processing module 314, graphic editing submodule 315 performs the operation of zoom, cut, move for graphics; meanwhile, graphic text processing submodule 321 deletes or revises the associated parameters and states of the text record. Halftone graphic display submodule 339 of display module 304 displays the current operation and operated results of graphic editing submodule 315 on monitor 6 in real-time mode. Similarly, graphic move submodule 316, driven by decoding processing module 314, performs the move operation for graphics, and move function text processing submodule 322 simultaneously revises, according to the result of 316, parameters and states and displays the results on monitor 6. Graphic copy operating submodule 317 can completely or partially copy lines, English and Chinese characters, mathematical symbols, equations and chemical symbols. Copy function text processing submodule 323 will delete relevant parameters and states in text record and write new ones in response to the operated results of submodule 317. Monitor 6, driven by certain submodules in display module 304, will display copy procedure and operated results performed by graphic copy submodule 317. When graphic insert operating submodule 319 is driven by decoding processing module 314 and the insert operation is ended, insert function text processing submodule 325 revises the parameters and states. At this time, what is stored in the insert function text process submodule 325 is the text record of current parameters and states. The relevant submodules in display module 304 simultaneously perform operating processing and display the procedure of insert operation and results on monitor 6 in real-time. Similarly, when the character style and size changing submodule is in operation, the relevant character style and size changing submodule 326 revises the relevant parameters and states according to the operated results of submodule 326. When character style and size changing operation is finished, what is stored in character style and size changing submodule 326 is the revised parameters and states of relevant characters. Now required character style and size are displayed on monitor 6.

As shown in FIG. 5, setting module 303 comprises the following submodules: Mathematical formula setting submodule 327; Mathematical formula setting submodule 333; Character page setting submodule 328; Character page setting text processing submodule 334; Halftone graphic setting submodule 329; Halftone graphic setting text processing submodule 335; Chemical structural formula setting submodule 330; Chemical structural formula setting text processing submodule 336; Music staves setting submodule 331; Music staves setting text processing submodule 337; Line-drawing and graphic submodule 332; and Line-drawing and graphic text processing submodule 338.

The working principles and procedures of setting module 303 are described as follows: When the commands processed by decoding processing module 314 select one of the setting submodules, the selected setting submodule, supported by setting rule library 305, will set up different conventions for different formats. When the selected setting submodule is in operation, the corresponding one of setting text processing submodules 333-338, will simultaneously perform the registering processing for operating results of the selected setting submodule. At the same time, the corresponding submodule in display module 304, driven by the selected setting submodule, carries out the corresponding display processing and displays the procedure and results of the setting operation on monitor 6 in real-time. For example, when scientific formula setting submodule 327 begins to operate under the control of the commands sent by decoding processing module 314, it will determine, according to the request of the command, the type of the scientific formulas which need to be composed (such as summation, limit, root, fraction, etc.), and inquire setting rule library 305 about the setting rules concerning the formula. It than performs the setting operation under the control of the user's command inputted from input device 1 and decoded by decoding processing module 314. At the same time, mathematical formula setting text processing submodule 333 will synchronously register the results of the scientific formula setting submodule into its memory. The corresponding submodule in display module 304 will simultaneously perform the display processing concerned. The overall procedure and results of mathematical setting operation will than be displayed on monitor 6 in real-time. It should be pointed out that mathematical formula setting submodule 327 can set not only a single type of mathematical formula, such as root expression, but also embedded formulas, i.e., different formulas mixed together (such as summing up first, then extracting of a root within a fraction, etc.). The following scientific formula is an example:

$$\sum_{i=1}^{n}\left(\sqrt{a^2+b^2}+\sqrt[2]{\frac{1}{1+x^2}+\frac{1}{1-y^2}}+2xi\right)$$

Setting module 303 can perform the following functions:

Functions concerning character setting

1. Changing character size.
2. Changing character style.
3. Mixed setting processing for Chinese and English characters according to the baseline rule.
4. Headline processing.
5. Left alignment, right alignment and center processing.
6. Punctuation logic at the beginning and at the end of a line.
7. Auto-substitution of a punctuation from full character position to half a character position in the beginning and end of line.
8. Auto-conversion of punctuation from horizontal setting to vertical setting or vice versa.
9. Equalizing the space between the characters and automatically processing unadjustable space between characters.
10. Automatically generating a ¼ space between a Chinese character and an English character and eliminating such a space at the end of a line, and automatically eliminating invalid space at the end of a line.

11. Automatically adjusting the character size of English, Greek, Russian, Chinese phonetic code and international phonetic code.

12. Automatically controlling the baseline position of English characters and special mathematical symbols (such as multi-space character).

13. Crossover English character processing.

14. Multi-column setting processing and auto-transferred column processing.

15. Automatically adjusting the line spacing for super-high formula or expression and performing line-merging processing.

16. Arbitrarily specifying column frames, column parameters and automatically controlling composing processing in a column frame.

17. Automatically dividing syllables of an English word and automatically generating soft-hyphens.

18. Character filling and table of contents setting processing.

19. Table-marker, point setting, defining and adoption.

20. Arbitrarily adjusting line spacing.

21. Character overlapping and adding a note below, above, or to the side of a character.

22. Widening character space.

23. Setting character width.

24. Vertical setting, arbitrarily interchanging between horizontal and vertical setting.

25. Page format assigning and displaying.

Setting processing functions concerning scientific formula and, chemical structural formula comprise the following 1. Superscript and subscript for multi-layer summation processing.
2. Multi-layer product processing.
3. Multi-layer limit processing.
4. Multi-layer integral processing.
5. Multi-layer superscript and subscript processing.
6. Extraction of root processing.
7. Super-extraction of root processing, including continued multi-layer extraction of root.
8. Fractional expression processing, including multi-layer continued fraction expression processing.
9. Vector expression processing.
10. Multi-layer and crossover processing for the formulas mentioned above.
11. Carbon chain processing.
12. Various benzene ring processing.
13. Combining processing of structural formula and composition formula by using copy, move and graphic functions.
14. Processing complicated expressions such as determinant and matrix by using position-setting key based on above fundamental functions.
15. Conveniently performing graphic and table setting operation by using line-art, copy and move functions.

Display module 304 includes halftone graphic display submodule 339, line-art graphic display submodule 340, English character display submodule 341, Chinese character display submodule 342, mathematical symbol display submodule 343 and graphic deletion and zoom submodule 344. The main use of display module 304, driven by input module 301, setting module 303 and editing module 302, is to carry out display processing for graphics and characters as well as the results of editing and setting process. Display module 304 also displays the processed contents on monitor 6 in real-time. Among others, halftone graphic display module 339 is used for displaying graphic; line-art graphic display submodule 340 is used for displaying line-art graphics; English character display submodule 341 is used for displaying English characters; Chinese character display submodule 342 is used for displaying Chinese characters; mathematical symbol display submodule 343 is used for displaying mathematical symbols; graphic deletion and zoom submodule 344 is used for displaying the deleted, enlarged and reduced graphics. For example, when editing or setting Chinese characters, Chinese character display submodule 342 will carry out display processing for the edited and composed Chinese characters and then display them on monitor 6.

Based on the above descriptions and FIG. 5, the operator can input commands, characters and symbols to editing and setting device 3 via input device 1; if only characters or graphics are inputted, they can be processed directly by display module 304 and then displayed on monitor 6. The operator can input, according to displayed contents, commands via input device 1, and move and erase the displayed contents through a corresponding submodule of editing module 302 in real-time. The operator can also perform setting operations for scientific formulas or others through a corresponding submodule of setting module 303. All those operations will be displayed on monitor 6 in real-time, and what is displayed is not text but visible graphics, lines, characters, mathematical symbols, formulas, etc. And so, the effect of "What You See Is What You Get" can be easily obtained.

Figure 6:
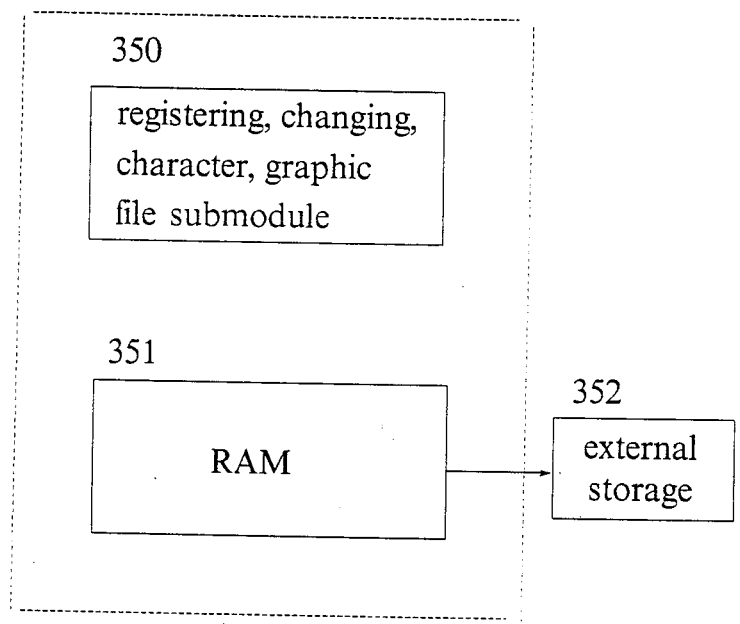
FIG. 6 is a detailed structural diagram for text processing submodules from 321 to 326 and from 333 to 338 in editing module 302 and setting module 303.

FIG. 6 shows detailed structures of text processing submodules 321–326 and 333–338 in editing module 302 and setting module 303, respectively. Among others, 350 is used to perform the corresponding operations of text registration, change, insertion and deletion following the operational results of editing submodules 315–320 or setting submodules 327–332. For text processing submodules 321–326 in editing module 302, submodule 350 is used to revise, register and delete the parameters and state values of the operated objects. For text processing submodules 333–338 in setting module 303, however, submodule 350 is used to register and change the operating results of the setting submodules. 351 represents a RAM for storing logged and changed results of character and graphic file submodule 350, and then sends the results to external memory 352 and store the logged and changed results in the form of named file. External memory could be any kind of recording medium, such as hard disk, floppy disk, tape or the like.

Figure 7:
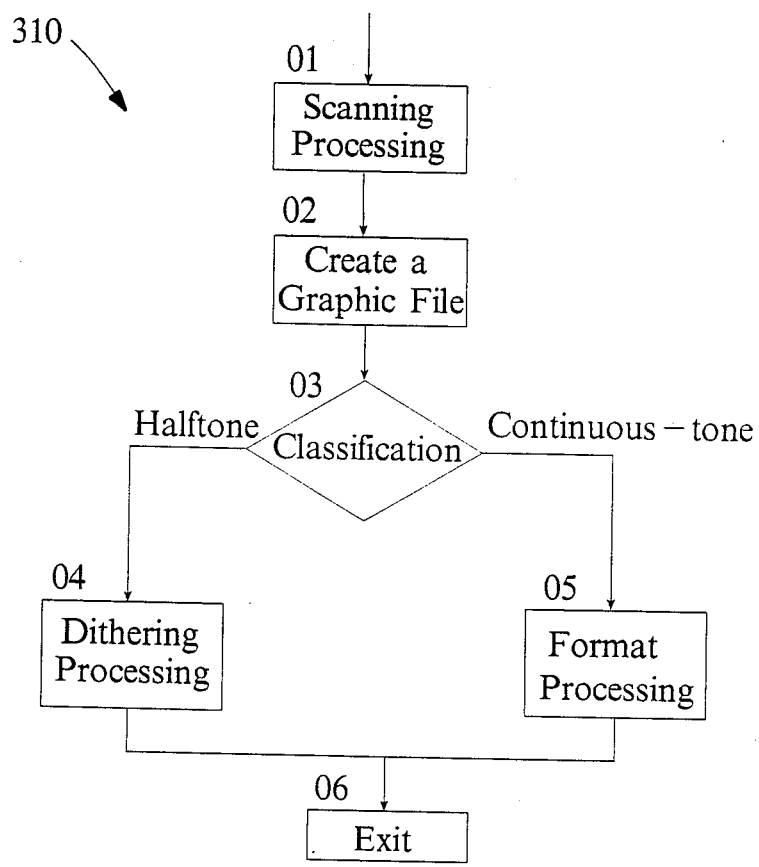
FIG. 7 is a flowchart of graphic input submodule 310.

FIG. 7 is a flowchart of graphic input submodule 310. In the flowchart, the graphics are scanned and digitalized by a scanner; thereby, it creates a graphic data file consisting of the name of the graphic, the scanning width, and the length of the spanned data, etc. Furthermore, a graphic can be classified into halftone (i.e., halftone pictures, etc.) graphics and continuous gray-tone (i.e., line-art, etc.) at step 03. For halftone graphics, they are dithered at step 04 so that the gray scale can be expressed and the pictures look more stereoscopic. Dithering processing is carried out by a dithering algorithm, i.e., performing XOR logical operation by using halftone sub-graphics with various rules of angular distribution. For continuous gray-tone line-art, they are processed by vector formatting. Then the line-art will be stored in external storage through step 06; after being processed by the decoding processing module 314, they are ready to be invoked by setting module 303.

Figure 8:
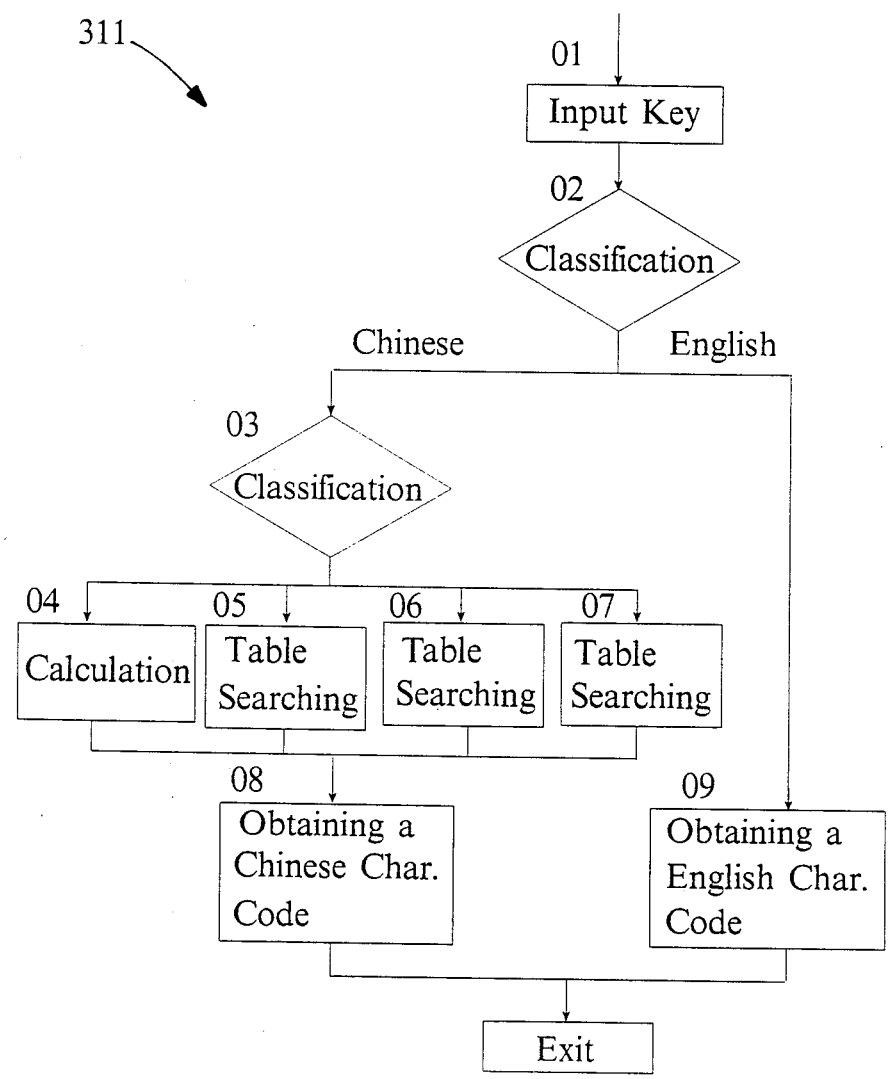
FIG. 8 is a flowchart of character input submodule 311.

FIG. 8 is the flowchart of character input submodule 311. When an operator makes a key-entry from the input device (such as keyboard), it will be classified at step 02. If it is a command for selecting Chinese character input method, then it will be further classified at step 03; if it is Zone Code method, then step 04 will generate Chinese character code directly by an algorithm which carries 1 digit for every 94 Chinese character zone codes; if it is telegram code method, a Chinese character code will be searched in Telegram Code And Chinese Character Code Table at step 05; if it is Chinese phonetic code method, a Chinese character code will be searched in Chinese Phonetic Code-Chinese Character Code Table at step 6; if it is a five-stroke method, a Chinese character code will be searched in Five-stroke Code-Chinese Character Table at step 07. When the inputted key-entry is classified and identified as an ASCII code of an English character, an ASCII code is obtained directly. The obtained Chinese character code (two bytes) or ASCII code (one byte) will be processed by decoding processing module 314 and sent to display modules 304, editing module 302 and composing module 303, respectively, for further processing.

Figure 9:
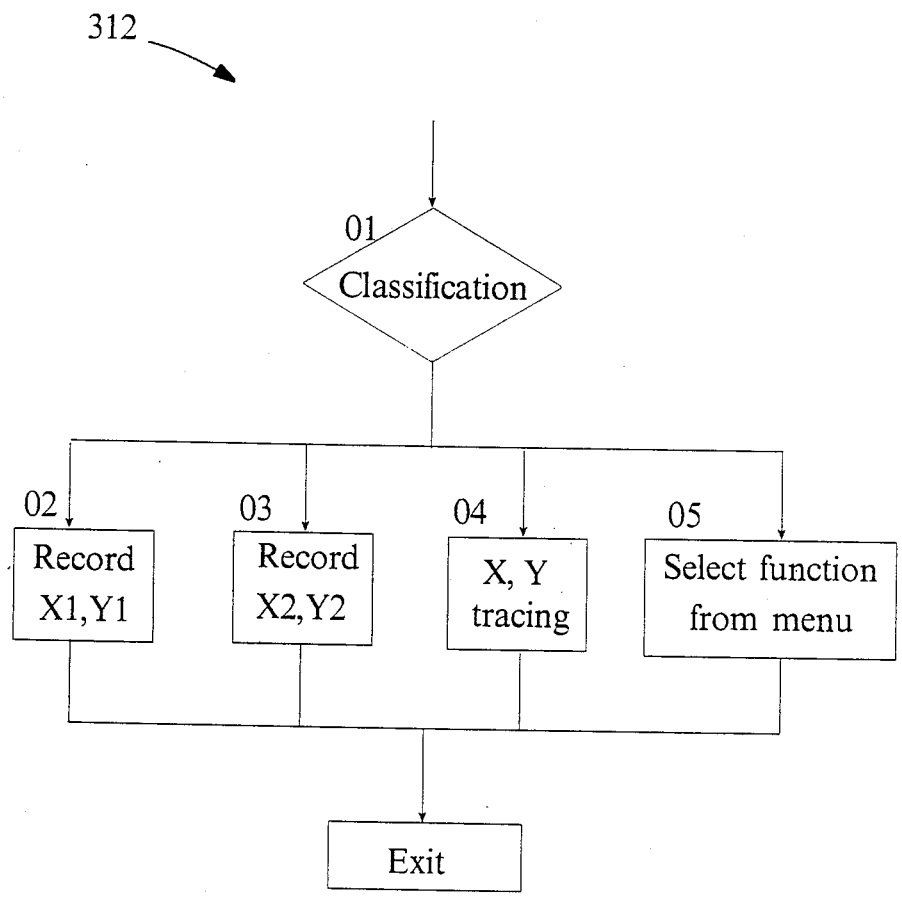
FIG. 9 is a flowchart of position input submodule 312.

FIG. 9 is a flowchart of position input submodule 312. The data controlling the visual position for setting are inputted by two kinds of input devices, one is a light-pen, mouse, etc.; another is keyboard keys which express the distance of step length and direction. If a light-pen or mouse are used to input positional data, then data will be classified by step 01. When a mouse selecting key is selected for the first time, a pair of position data (X1, Y1) corresponding to the cursor on monitor 6 at step 02 is recorded; if the selecting key is selected for the second time, then another pair of position data (X2, Y2) corresponding to the cursor on monitor 6 is recorded at step 03; if selecting key is in released state 04, then the mouse can freely trace, modify and record the X,Y values of current position. When classifying step 01 identifies the value Y higher than normal value (appointed value), the functions will be selected through the menu at step 05. The pairs of position data recorded at steps 02 and 03, and the current values of X,Y obtained at step 04 are branched to modules (302–304) waiting for further processing.

If the step key on the keyboard is selected, and the direction-key is preset for up, down, left and right directions, and the increment (step) on each direction is also preset for every drive, the current position (X,Y) relative to the previous position can be obtained by accumulating calculation, or the absolute position X,Y of the current point can be figured out in respect of preset original point (i.e., X=0, Y=0).

Figure 10:
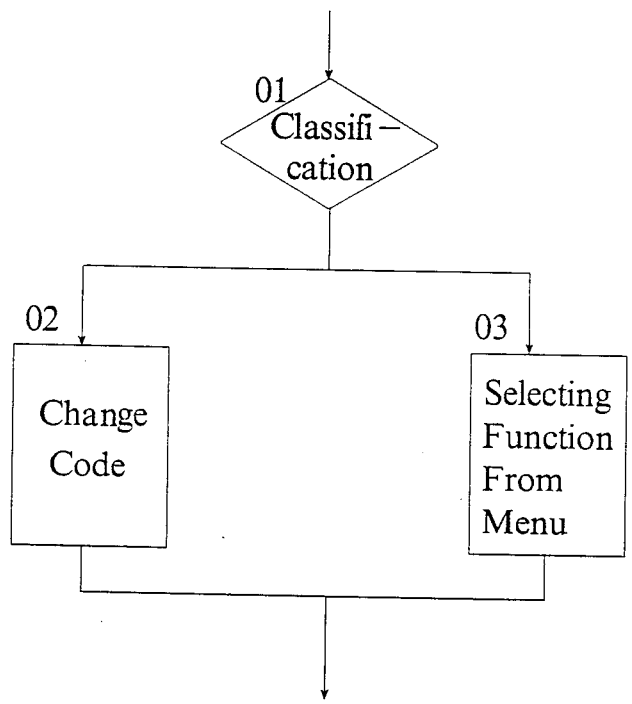
FIG. 10 is a flowchart of control command input submodule 313.

FIG. 10 is the flowchart of the control command input submodule. Control commands can come from different input devices (keyboard, mouse, or light-pen, etc.). If command code is inputted from the keyboard, one or more than two sets of command codes can be obtained by step 01 and decoded into a two-byte, unified control command code through step 02. If the command is inputted from the mouse, the preset command code will be produced by selecting functions from a menu at step 03 or selecting released status from mouse.

Figure 11:
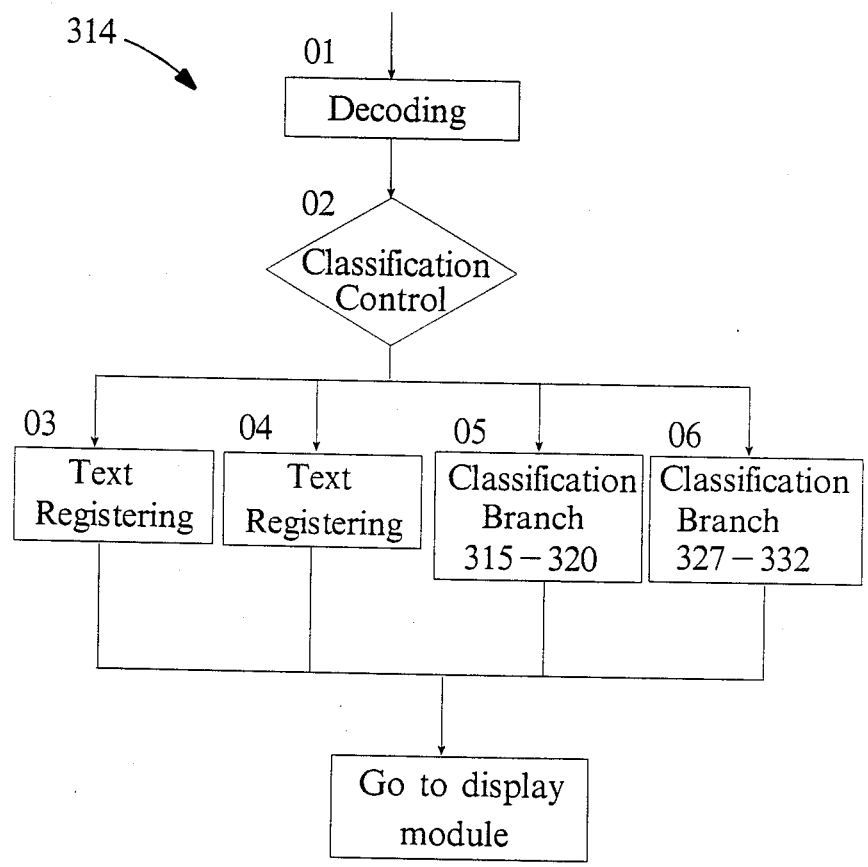
FIG. 11 is a flowchart of decoding processing module 314.

FIG. 11 is the flowchart of the decoding processing module 314, and its operating procedure is as follows: The received Chinese character code, English character code, mathematical symbol, command control code and the line are decoded into a unique internal code, respectively, at step 01. They are then classified at step 02. If it is a character code, then it will be registered into the text (i.e., stored in RAM) and sent to display module 304 for display processing; at the same time, it will be sent to corresponding submodule in corresponding setting module 303 for setting processing. If it is a graphic, it will be registered according to registering requirements for graphic text at step 04. The corresponding submodule in display module 304 is driven to perform processing operation and display graphs on monitor 6; at the same time, the corresponding submodule 329 in setting module 303 is controlled to perform graphic setting. If it is an editing control command, it will be classified through step 05, then sent to the corresponding one of submodules 315–320 of editing control module 302 for an editing operation; at the same time, control the corresponding submodule of the display module 304 for display processing and finally displayed on monitor 6 in real-time. If it is a setting control command, then they will be classified and branched to the corresponding one of setting submodules 327–332 of setting module 303 to control the composing operation. Similarly, this decoded command will also be sent to the corresponding display submodule in display module 304 to perform control operation so that it can be displayed on monitor 6 in real-time.

Figure 12:
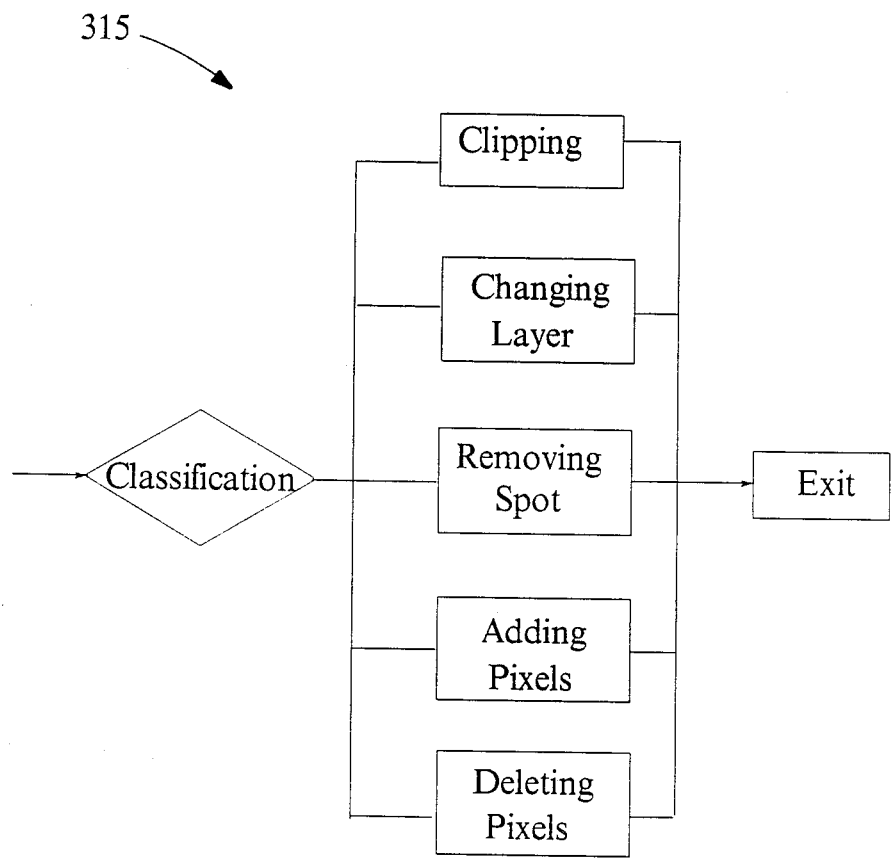
FIG. 12 is a flowchart of graphic editing submodule 315.

FIG. 12 is the flowchart of graphic editing submodule 315 which is used to perform editing operations for graphic files. First, the editing commands from decoding processing module 314 will be classified at step 01; then the graphics will be conventionally clipped at step 02, modified for halftone processing at step 03, processed for eliminating spots at step 04, processed for adding the pixels at step 05, processed for deleting the pixels at step 06 and then branched to the exit after the processing is completed.

Figure 13A:
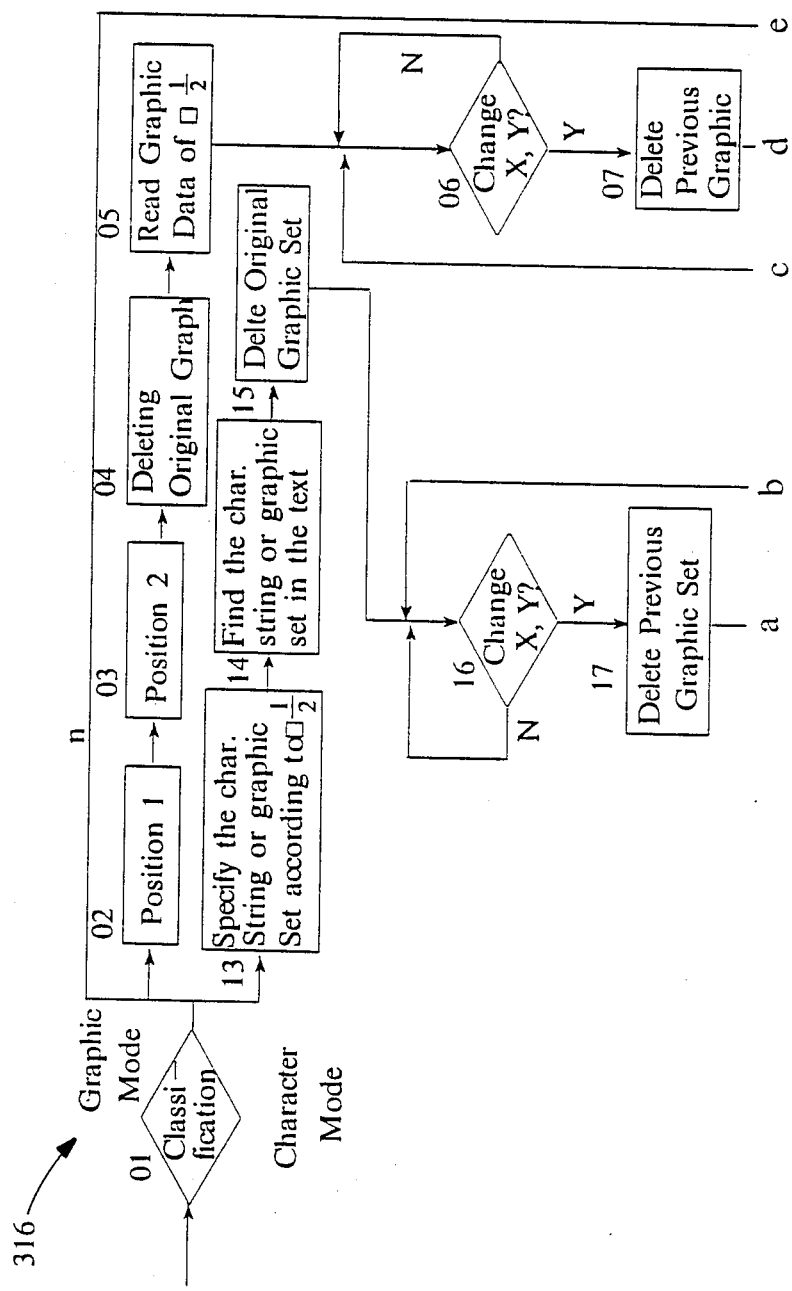
FIG. 13 is a flowchart of graphic move submodule 316.
Figure 13B:
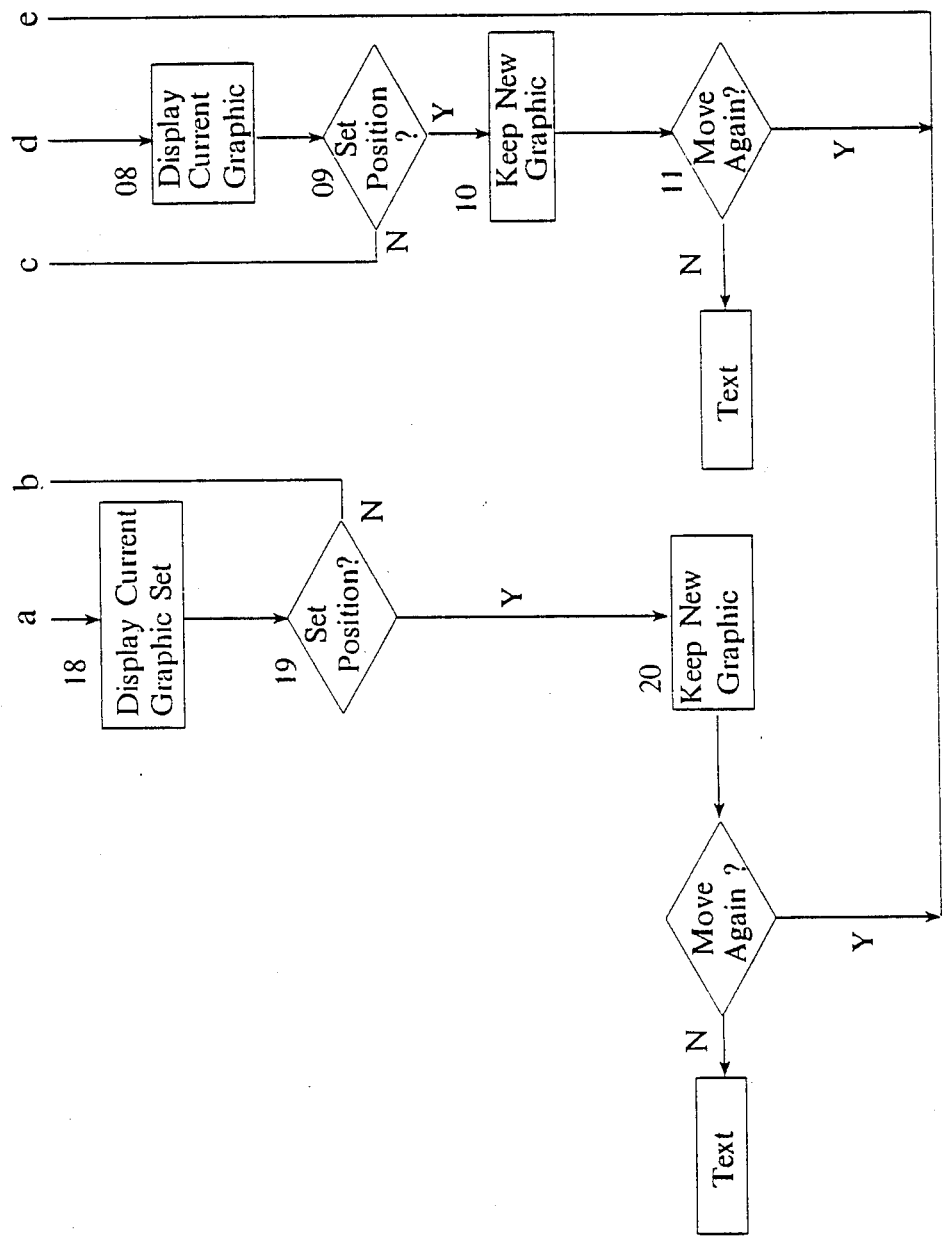

FIG. 13 is the flowchart of graphic move submodule 316. The operation of graphic move submodule 316 is divided into graphic mode and character mode. As shown in FIG. 12, the graphics will be classified at step 01 first. If processed in graphic mode, step 02 will receive position data 1, then receive position data 2 at step 03 and produce a rectangular block formed by position data 1 and 2 as opposite vertices at step 04. The data corresponding to the rectangle will be retrieved from graphic buffers and a judgment will be made at step 06 based on whether the values of X,Y have been changed by the operator. If the values of X,Y have not been changed, the system will be in a waiting state; otherwise, the previous graphic will be eliminated by logical operation (for example, XOR logical operation, reset to zero, etc.). The graphic then will be displayed in current position by step 08, step 09 will judge whether the current position is set. If not set, go back to step 06 for judging the X,Y values. The procedure where the graphic is displayed and deleted in different area is repeated (the graphic in the original position is eliminated) so that the graphic will be eventually moved by the operator. Once the current position is set by the operator, the move will be stopped and the objective of moving the original graphic will have been reached. If processed in character mode, step 13 will assign fixed position 1 and fixed position 2, step 14 will then search the character string or graphic set which is located within a rectangle that is made by opposite vertices of fixed position 1 and fixed position 2 in text, and eliminate original character string or graphic set. Step 16 will make a judgment for current values of X and Y. If the values of X and Y have not been changed, the system will be waiting in a loop; otherwise, the character string or graphic set will be eliminated at step 17 and new ones will be displayed at the current position. Step 19 will make a judgment for the current position, and if the current position is not fixed, steps 16-18 will be executed repeatedly. The effect is that character string and graphics are continuously moved through character mode (original characters and graphic set are deleted) until the position is fixed, where step 20 keeps the current characters or graphics. Through the operations described above, the present invention can perform the move operation for hybrid characters or graphics individually. It is different from the move operation of graphic mode, providing advantage of flexibility and visualization.

Figure 14A:
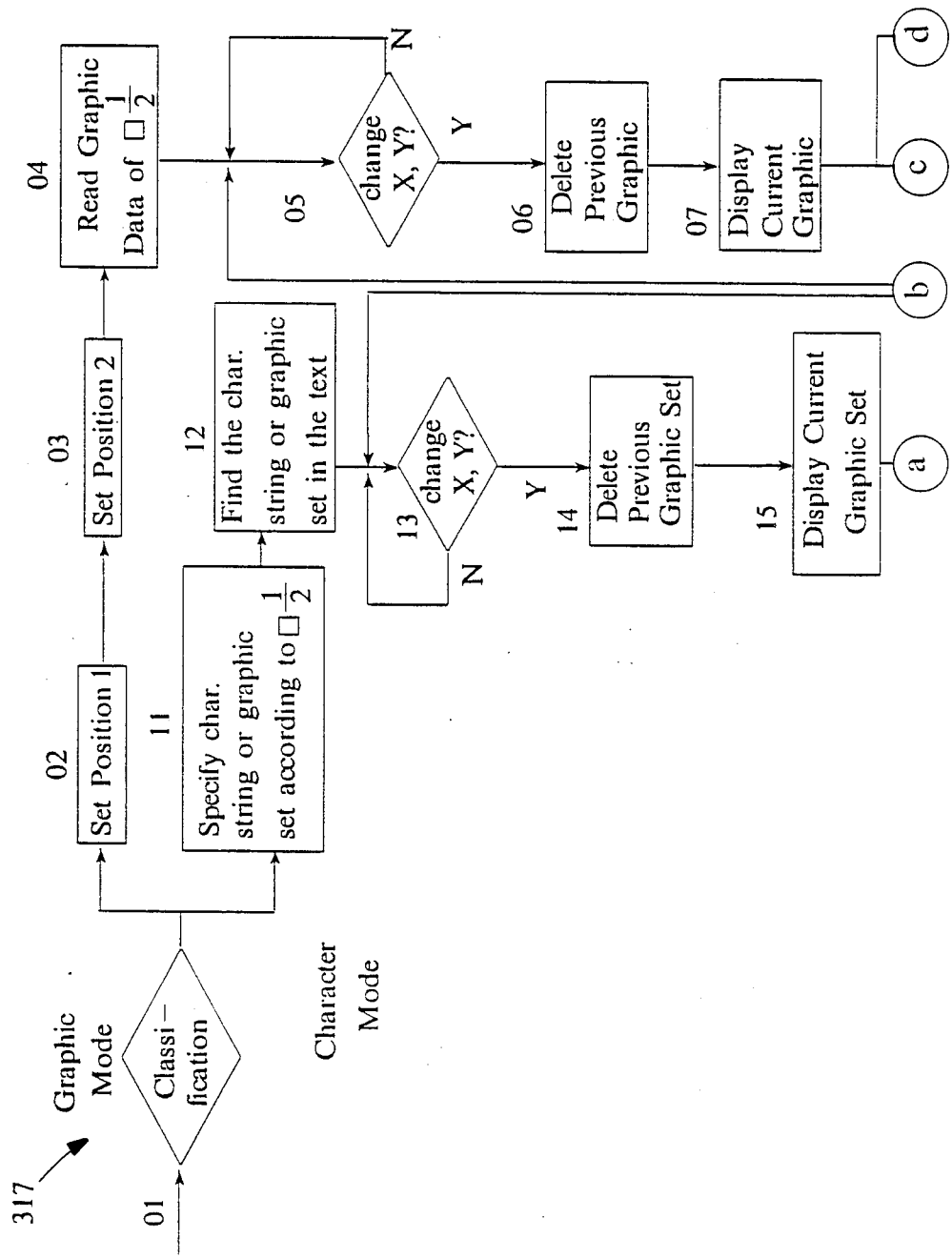
FIG. 14 is a flowchart of graphic copy submodule 317.
Figure 14B:
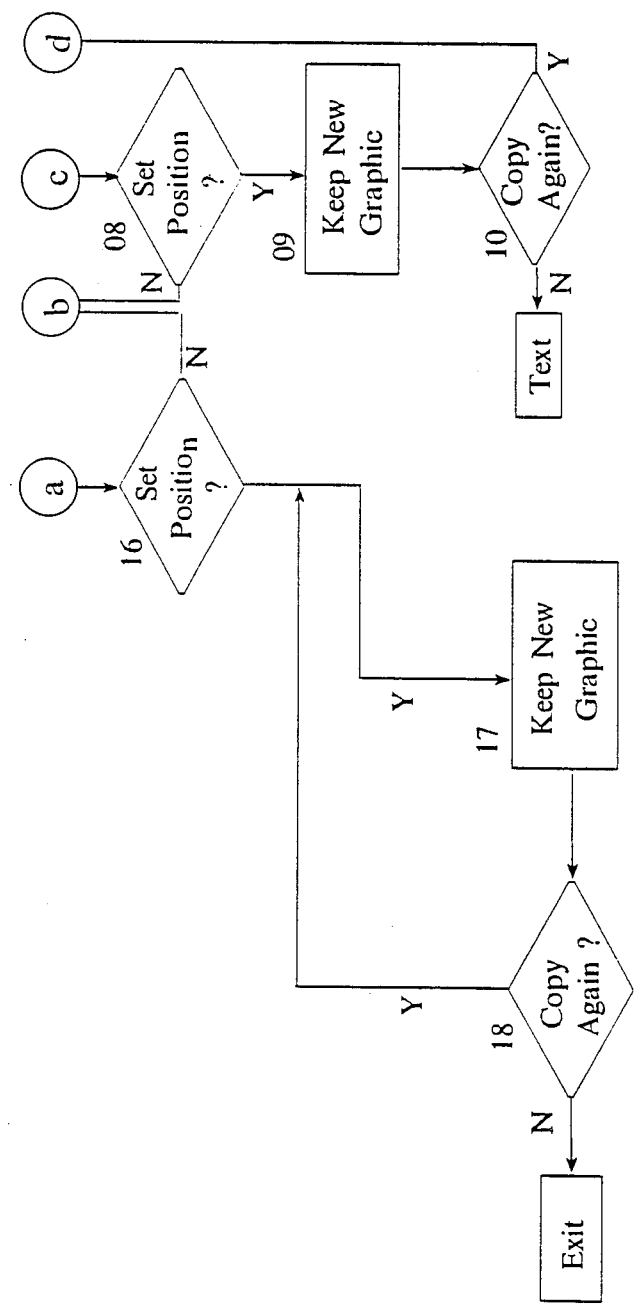

FIG. 14 is the flowchart of the graphic copy submodule 317, and its working principle is similar to that of move operating submodule 316. Its operation is divided into graphic copy mode and character copy mode. If it is in graphic mode, steps 02 and 03 provide the position values of two points, then the graphic data in the rectangular block formed with position points 1 and 2 as opposite vertices are read out from the buffer, and step 05 will determine whether the values of X,Y have been changed by the operator. If the values have not been changed, the system will wait. If the values have been changed, the graphic at previous position will be deleted at step 06, and the graphic will be displayed at the current position at step 07, the move effect having been achieved. Since the data is just read out from the graphic buffer, and not deleted by a logic algorithm, it is different from the move operating submodule. The original graphic is still in the original position, and an identical one, which can be moved by the operator, is produced. Then step 09 will determine whether the operator has set the position for the copied graphic. If not set, the system will perform steps 05-07, achieving the effect of moving. Once the position is set, the duplicated graphic remains at the current position. At this time, a moved graphic follows the movement of the position (i.e., mouse, etc.) operated by the operator. Step 10 will judge whether the duplication is needed. If it is needed, steps 05-09 will be repeated, and duplication will be performed again, until no duplication is needed. If character copy mode is used, the steps are similar to those of graphic move operating. The only difference is that the graphic mode of deleting, displaying, and moving adopts character graphic displaying and deleting method instead of pixel matrix processing. The reason for using such a method is that there is an advantage in retrieving any one or more characters or graphics from crossed, overlapped character strings or graphic sets, so carrying out the graphic copy operation in which the steps are the same as the steps of the above graphic copy mode for characters.

Figure 15:
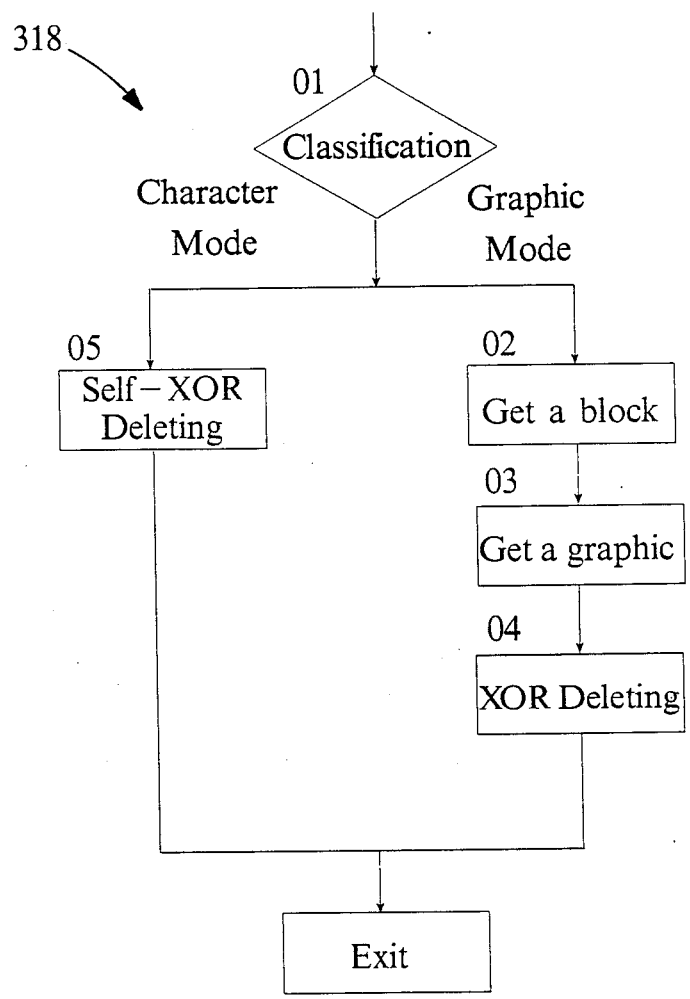
FIG. 15 is a flowchart of graphic deletion submodule 318.

FIG. 15 is the flowchart of graphic deleting submodule 318. Graphic mode and character mode are also adopted. When a deleting operation is performed with graphic mode, a block (rectangular block formed by two position points) is made at step 02. Step 03 will retrieve sub-graphic data Gl, which is determined at step 02, from a graphic buffer. Step 04 will perform a logic operation to sub-graphic data Gl with the sub-graphic data in the original position, and then send sub-graphic data Gl to a graphic display buffer. Thus, the objective of deleting graphics is achieved. If the graphic is deleted in character mode, step 05 will perform a logic operation to the same position, same character string or same graphic set (e.g., XOR operation with itself), and the objective of deleting an original character string or graphic set is achieved. By using the above processing procedure, a single character or graphic, or portion of characters or graphics, can be selected in a crossed, overlapped character string graphic set for the deleting operation, providing high flexibility.

Figure 16:
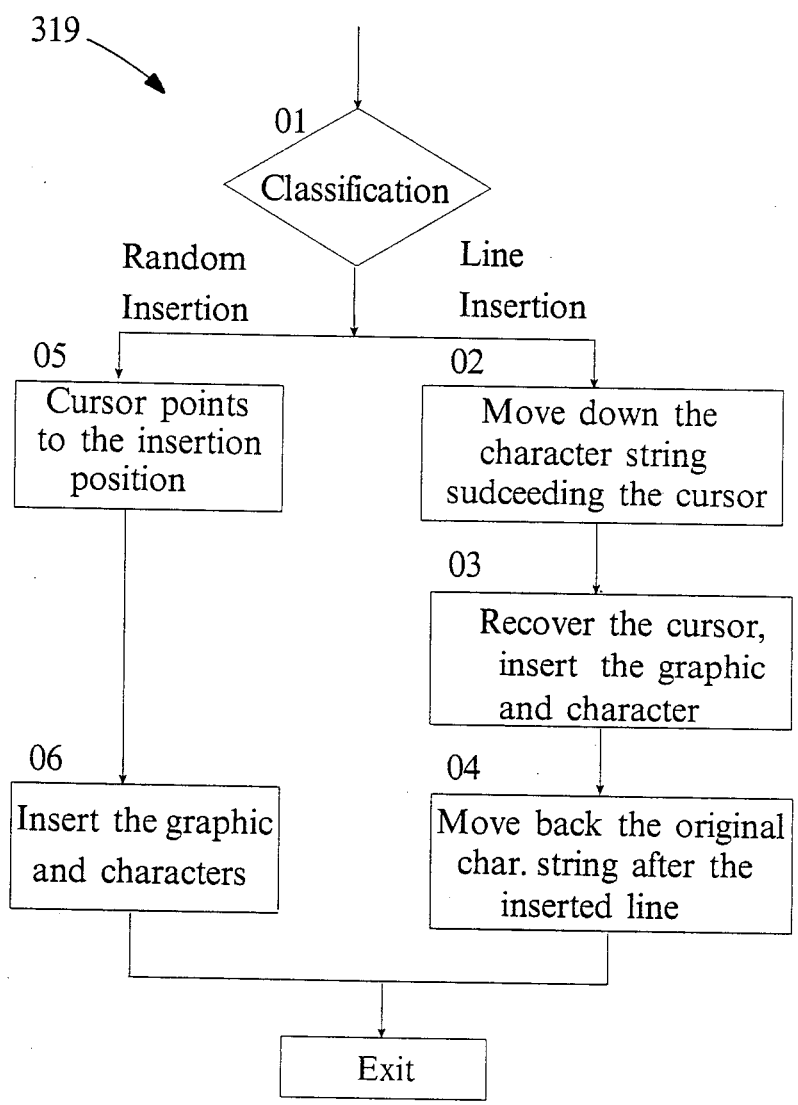
FIG. 16 is a flowchart of graphic insertion submodule 319.

FIG. 16 is the flowchart of graphic insert submodule 319. First, the characters or commands entered into the graphic insert submodule will be classified. If the characters are inserted in the middle of a line, step 02 will move down the second-half of the line for one line space. Step 03 will recover the cursor and receive the characters or graphics (could be a single character or graphic) inserted by the operator at break point of the line. When the insertion is done, step 04 will move back the second-half of the line right after inserted character string or graphics, keeping the original line integrated. If insertion takes place in any position, step 05 will point at the inserting position. And step 06 will set cursor and receive characters or graphics inserted by the operator, thus achieving inserting operation.

Figure 17:
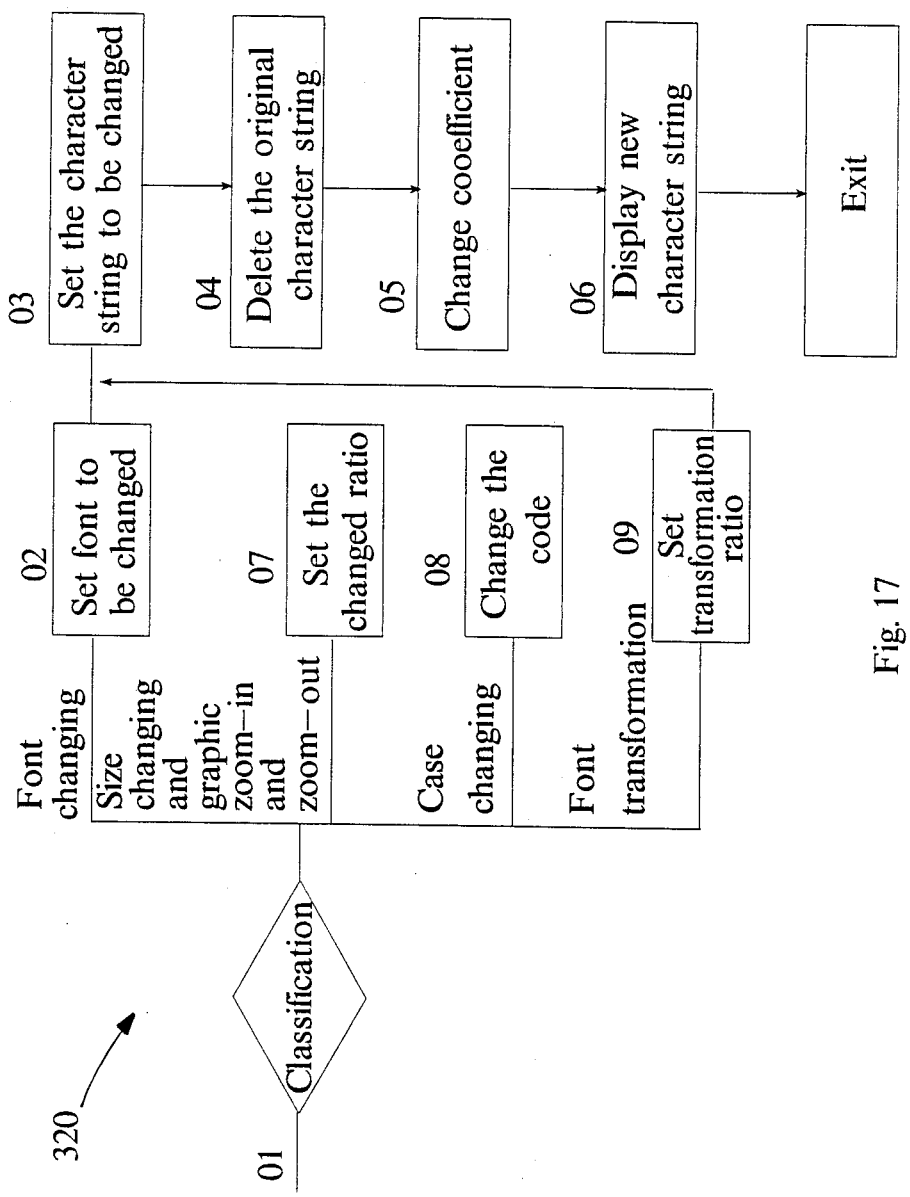
FIG. 17 is a flowchart of character style and size modification submodule 310.

FIG. 17 is the flowchart of character style and size changing submodule 320. First, the input commands or characters will be classified at step 01. If it is a character style changing operation, the operator will assign what character style is needed by input device 1 at step 02. The characters which need to be changed will be set at step 03. Step 04 will eliminate the original characters. Step 05 will change the corresponding parameters in text. Step 06 will display the needed character string, and so achieve the changing operation. If the character size needs to be changed or a graphic size needs to be enlarged or reduced, the operator will set character changing coefficient and graphic zoom-in or zoom-out ratio at step 07, then the operation will be branched to steps 03-06 for changing the parameters and re-displaying the character strings or graphics, respectively, thus achieving the objective of changing character and graphic size. If it is the character shifting operation, the corresponding code parameters in the text will be changed directly; steps 03-06 will achieve the parameter changing and re-displaying process. If it is the character size changing operation, the operator will set changing ratio at step 09, and steps 03-06 will achieve coefficient changing, re-displaying process, thus achieving the operation.

Figure 18:
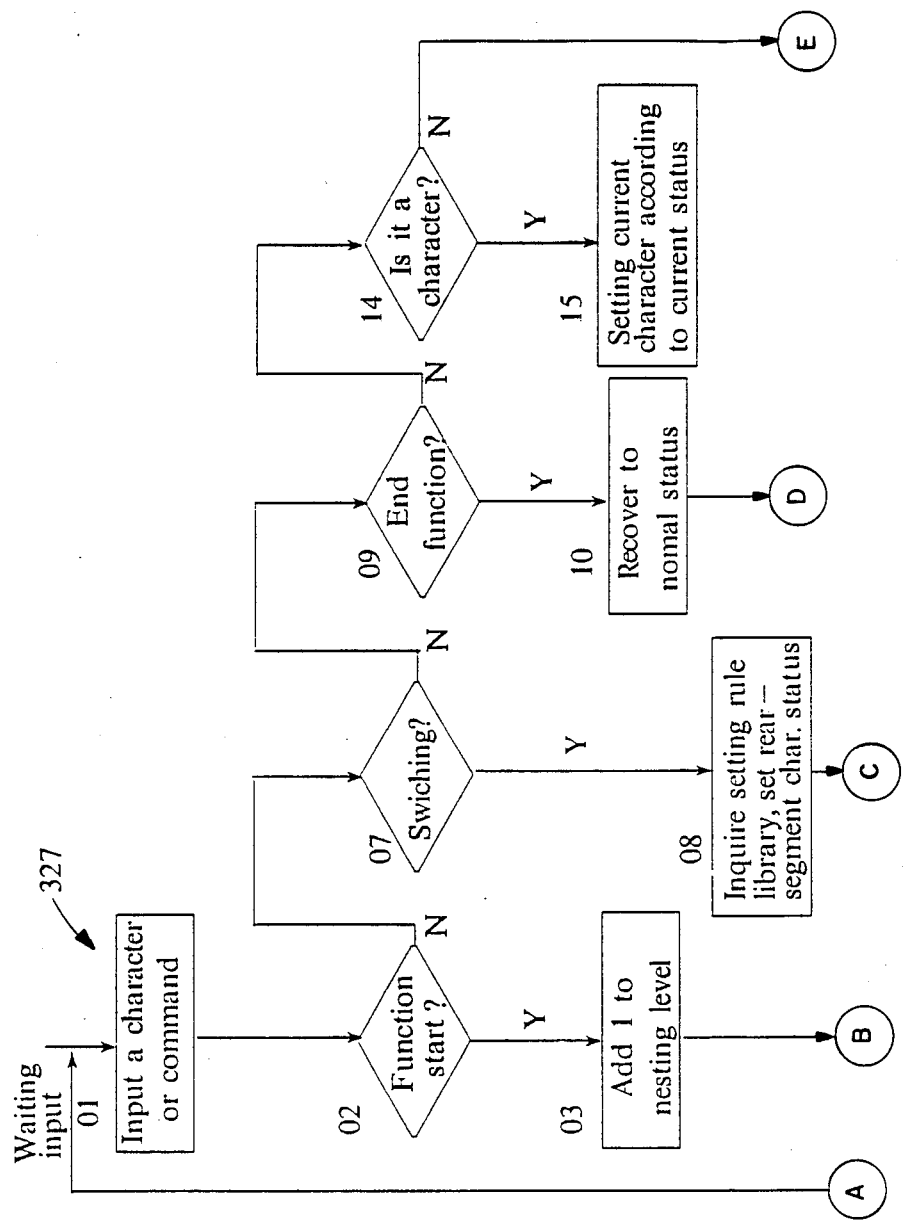
FIG. 18 is a flowchart of scientific formula setting submodule 327.
Figure 18B:
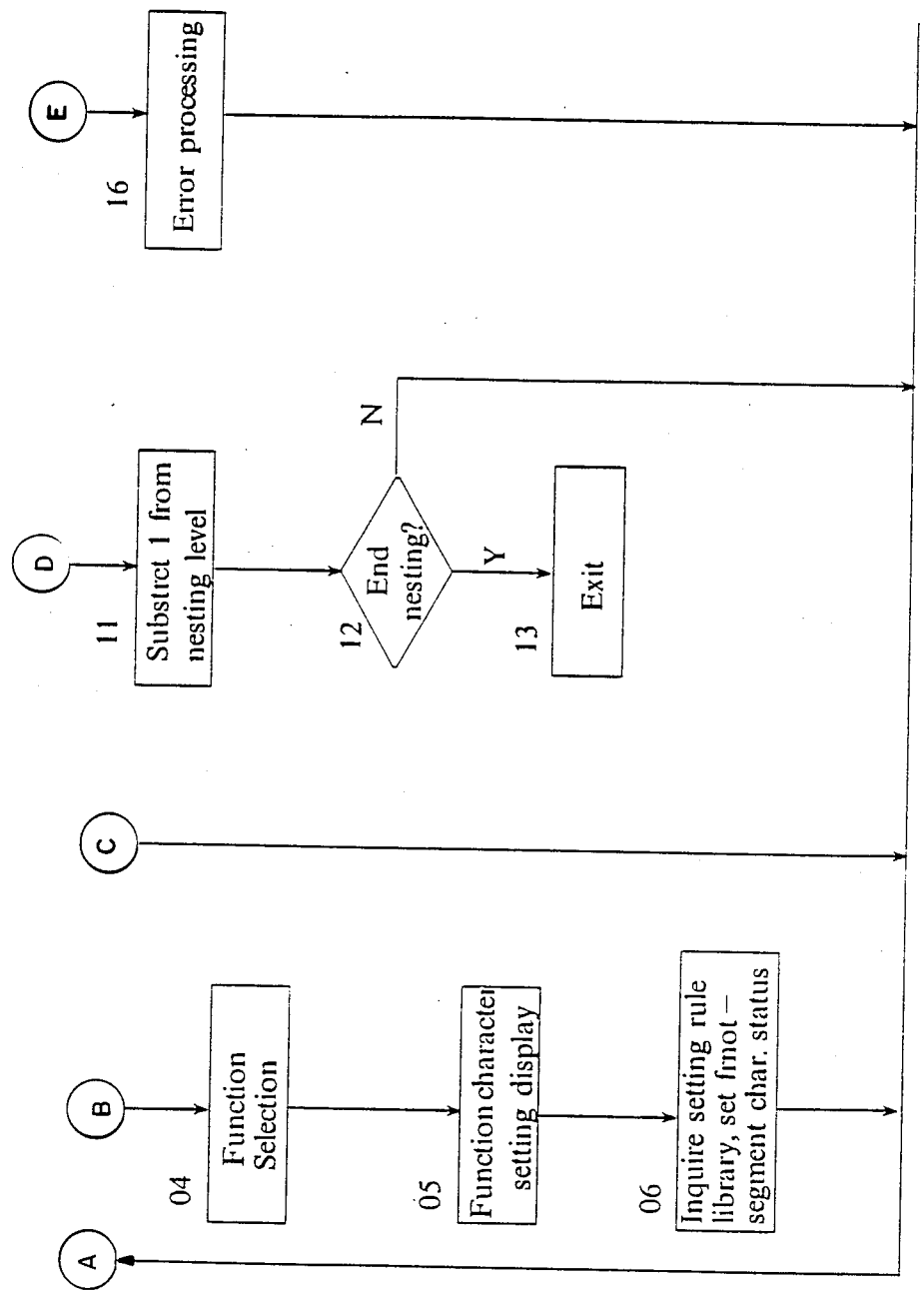

FIG. 18 is the flowchart of the scientific formula setting submodule 327. The submodule 327 receives a character or control command from decoding processing module 314. Step 02 will determine whether it is a function start command. If it is, step 03 will add 1 to nesting level, and at step 04 the operator will select the function at step 04 for scientific formulas, such as integral, summation, fraction, superscript, subscript, limits, root, formula, vector, and the like. After a function is selected by the operator, step 05 will retrieve the characters from character generating system and character library for the selected function according to current assigned character style, character size, position (setting basis) and perform setting display. Then, the setting rule library will be inquired, and the current setting status will be set. Then the control will be waiting for inputting the first segment of the formula according to the character size and positional coefficient following setting rules. If step 14 determines that the characters are inputted, the control will perform setting operation according to the current character size and position, and display the formula on the monitor with exact character style and size, then go back to step 01, waiting for input characters or commands. If step 07 judges that it is the command in which the first segment of the characters is switched to the second segment of the characters, the setting rules concerning the second segment of the characters will be inquired in the setting rule library (e.g., a superscript of an integral or numerators of a fraction). The status of the character size and setting position of the second segment are set, and then control will branch to step 01, waiting for input characters or commands. If step 09 judges that it is a command of function setting end, the setting process will return to normal status via step 10, and the nesting level will be decreased by 1 at step 11. Step 12 will judge whether the nesting is ended; if so, it goes to the exit—otherwise, it goes to step 01 for receiving further input characters or commands. If it is neither characters nor command, then it performs error-processing, and goes to 01 again, waiting for the input of characters or commands.

In order to describe the operating procedure of this submodule more clearly, let's look at the setting procedure of an integral as an example. In FIG. 19, if the operator needs to compose an integral, he should only input an integral command (function key F12) from the keyboard, and an integral symbol is then displayed on the monitor immediately. Then input lower-limit A, and the character size and position for A, are arranged under the integral symbol automatically. Then input a switching command (function key F9), and the cursor is switched to the position of upper-limit. Now, input an upper-limit B, and then input a recover command by pressing function key F8, where the cursor is recovered to the normal text status. Next, x and dx are inputted into the integral expression, the setting procedure of the whole integral is completed.

Figure 20:
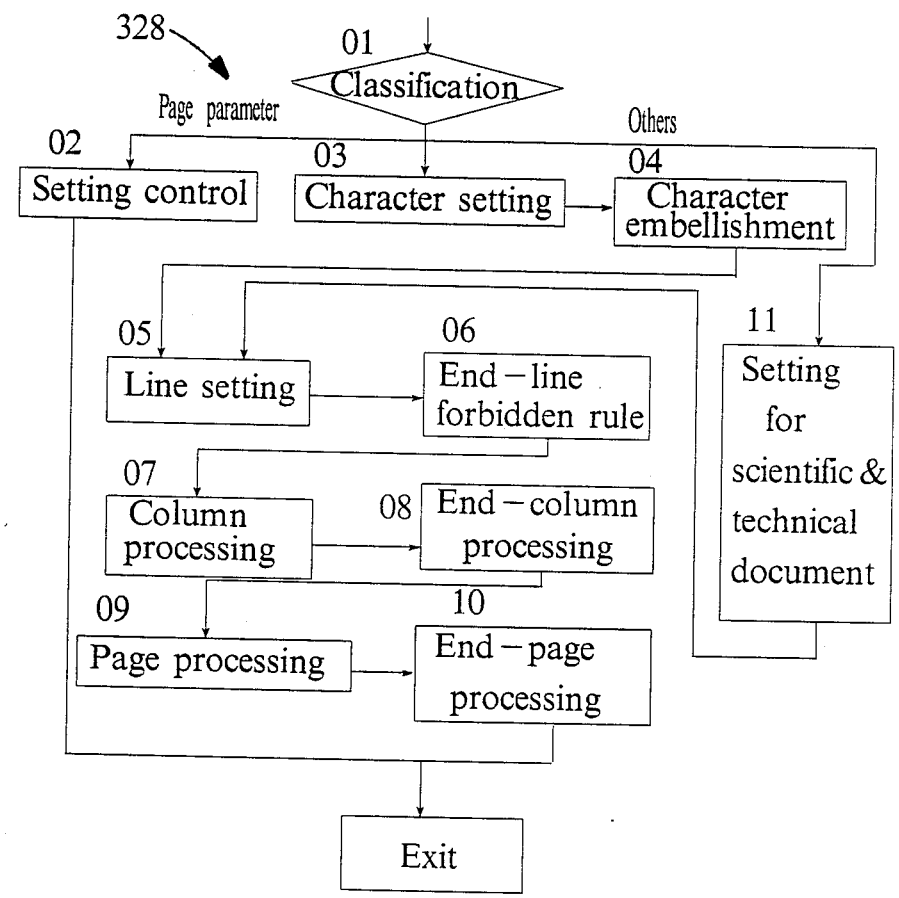
FIG. 20 is a flowchart of page design setting submodule 328.

FIG. 20 is the flowchart of the text page setting submodule 328. Similarly, the input characters or commands are classified at step 01. If it is a page format control command, step 02 will determine the page parameters, including the column width, column depth, space between columns, line space, character style and character size, etc., for controlling the composing procedure of the concerning characters, lines, paragraphs and pages. If it is a character, then step 03 will perform typesetting processing, step 04 will perform character modifying processing, step 05 will perform line-setting processing, step 06 will perform end-line processing, including end-line punctuation logic processing (i.e., the beginning punctuation may not be at the end of a line, and end punctuation may not be at the beginning of a line, etc.); inseparable string processing (i.e., character string or number string may not be divided into two lines); automatic syllable separation for English words (i.e., a part of English word at the end of a line is divided into the next line according to syllable separation rule); line-dividing processing and line-aligned processing, step 07 will perform column-dividing processing, step 08 will perform end-column forbidden rule processing (e.g., inseparable: "FIG. 1," and heading may not the placed at the end of a column); step 09 will perform page-dividing processing, when the specified page depth is reached, the texts will be transferred to the next page automatically; Step 10 will perform end-page forbidden rule processing, similar to step 08. If step 01 judges that non-formatted commands and characters are encountered, the corresponding setting submodule will perform corresponding setting processing.

Figure 21:
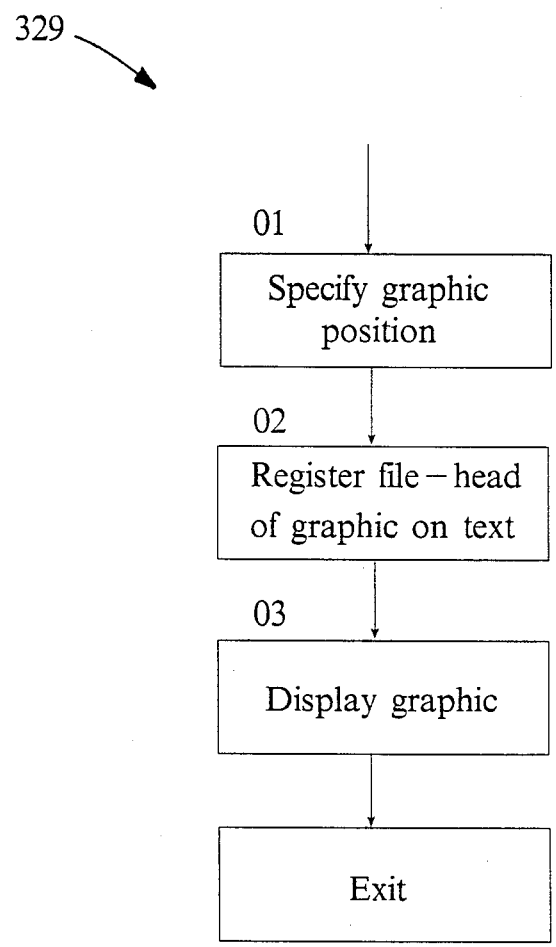
FIG. 21 is a flowchart of halftone graphic setting submodule 329.

FIG. 21 is the flowchart of halftone graphic setting submodule 329. Among others, step 01 will assign a graphic setting position. Step 02 will register the file-header to the text buffer, now a graphic is treated as a character. Step 03 will display the graphic on the monitor. Step 04 will go to the exit. If the setting position is not properly set, the corresponding editing submodule in editing module 302 will modify the position.

Figure 22:
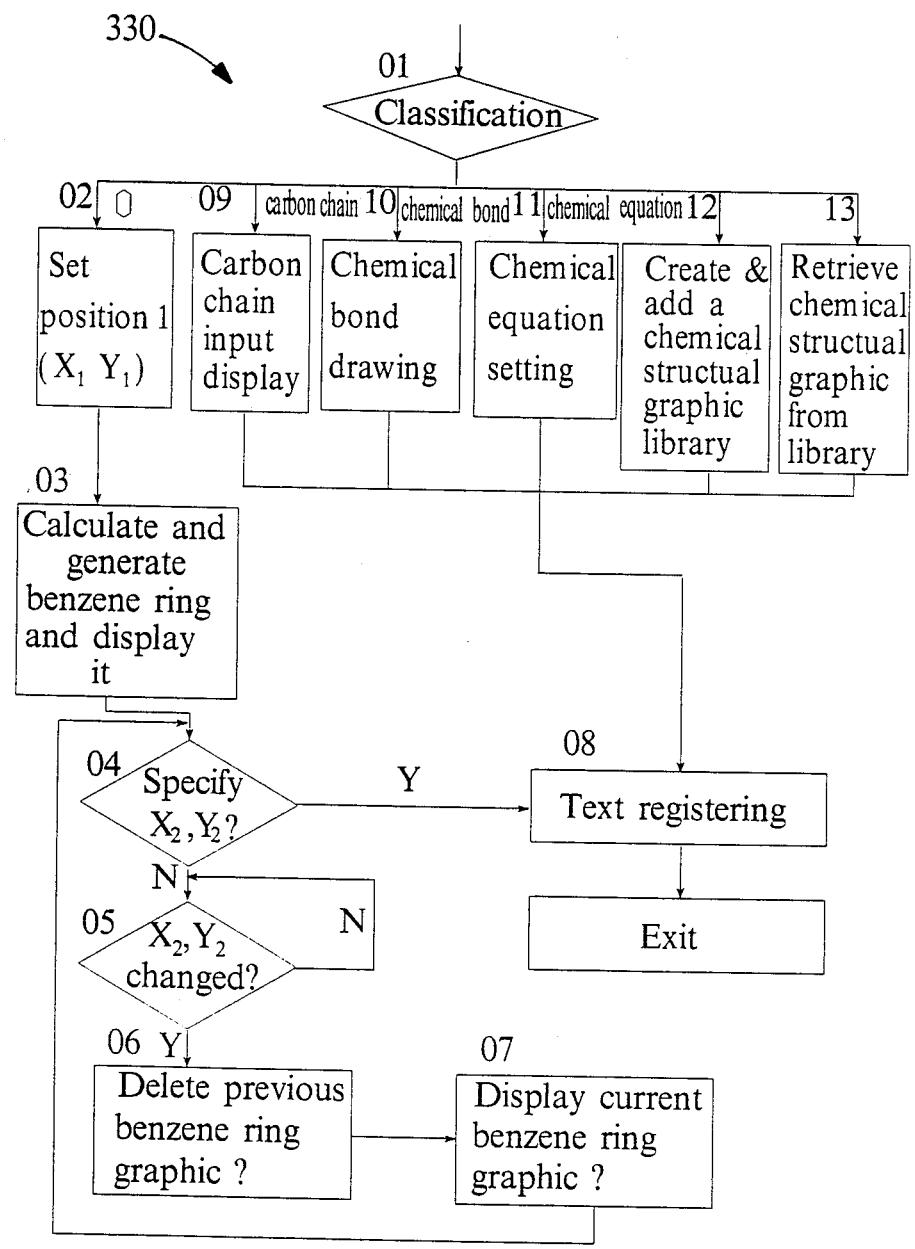
FIG. 22 is a flowchart of chemical structural formula setting submodule 330.

FIG. 22 is the flowchart of the chemical structural formula setting submodule 330. The input commands or characters are classified at step 01. If it is a common benzene ring operation, the operator will specify and record the start position (X1, Y1) by pressing selecting key on the mouse. Then the operator will move the mouse, recording the current position (X,Y) in real-time. Step 03 will produce and display a hexagonal benzene ring, formed by the position values (X1, Y1)-(X,Y) as opposite vertices, according to the characteristic of hexagonal benzene ring having 120 degree vertex angle. The judgment will be made to determine whether it is the required one; if not, the shape and size of the benzene ring can be changed by moving the mouse (e.g., changing the values of X,Y). Step 06 will eliminate the previous graphic by performing logical operation through 07, and the graphic will the displayed based on the X1, Y1 and current X,Y values. Step 04 will be repeated to judge whether the operator has finally specified the end point (X2, Y2). If not, then steps 05, 06, 07 will be repeated in a loop, continuously changing the position and eliminating the previous benzene ring graphic and displaying the current one. By doing so, the size and proportion of the benzene ring is kept changing, and the effect of continuously drag-changing is achieved. Once step 04 judges that the operator has set end point (X2, Y2), i.e., a satisfied benzene ring graphic is finally set by the operator, step 08 will perform text registering operation, then go to the exit.

If step 01 classifies the characters or commands as carbon train operation, step 09 will perform setting processing to carbon train a set of characters and step 08 will perform text registering operation, then go to the exit.

If step 01 classifies the characters or commands as a chemical bond operation, the chemical bond will be achieved by using line-drawing and step 08 will perform text registering operation and then exit.

If step 01 classifies the characters or commands as chemical reaction formula, the formula will be achieved by scientific formula setting processing and step 08 will perform text registering operation and then exit.

If step 01 classifies the characters or commands as creating and adding a chemical structural model to the graphic library, the chemical structural graphics which are frequently used will be saved in the graphic library, where they can be invoked whenever needed. If step 01 classifies the characters or commands as loading a chemical structural model from the graphic library, the operator can retrieve a chemical structural model from the graphic library and conveniently duplicate the model by copy operation of editing function. And so, the operation is simplified and the efficiency is increased.

Figure 23:
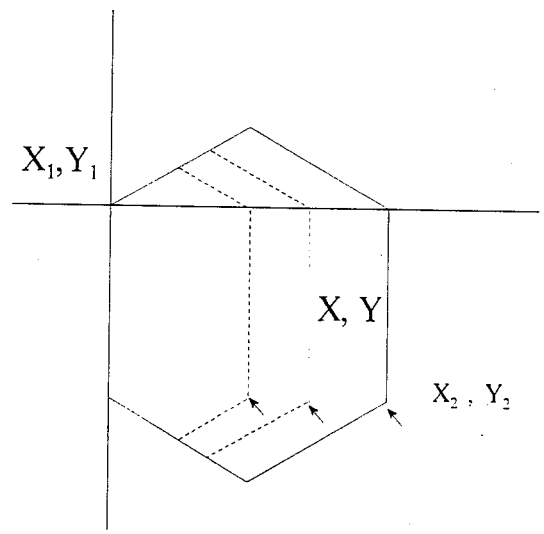
FIG. 23 is a diagram showing the setting procedure of chemical structural formulas, according to the present invention.

Using the benzene ring graphic shown in FIG. 23 as an example, when the operator has set the start position, a benzene ring graphic is created. Nevertheless, as long as the operator continuously changes the X,Y values by moving the mouse, the size and shape of the benzene ring graphic will be continuously changed, until the operator sets the X,Y values, the corresponding benzene ring graphic will remain.

Figure 24:
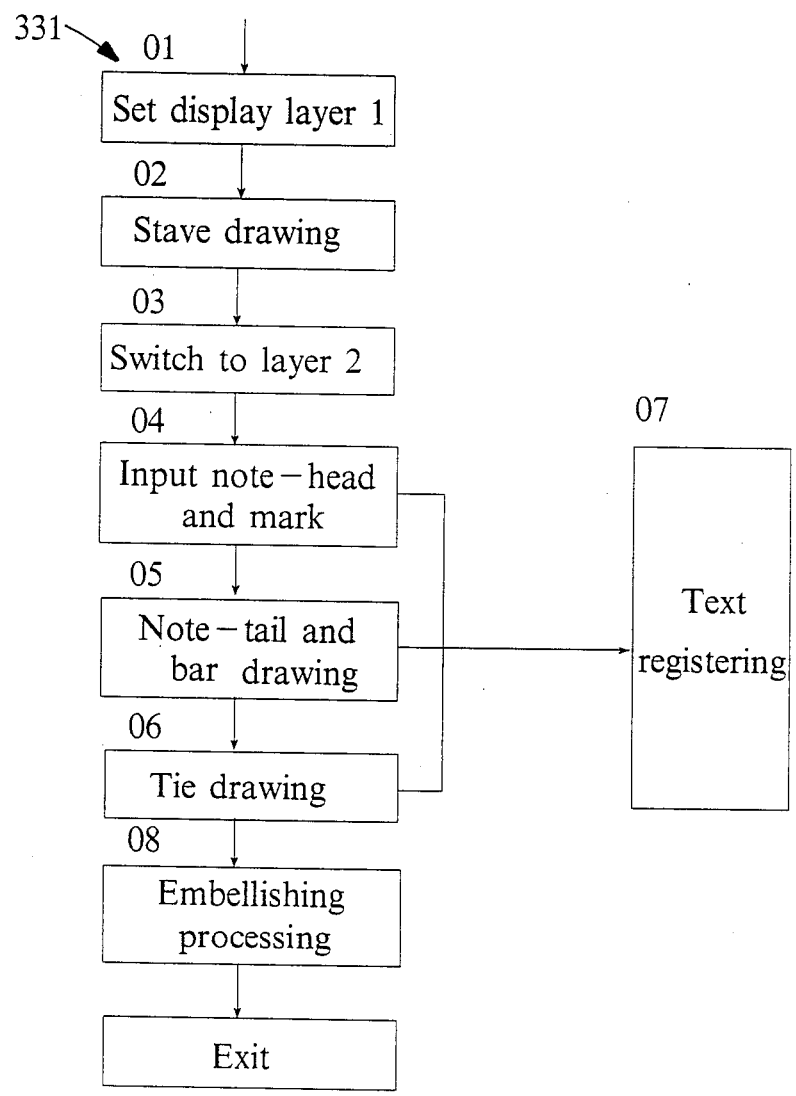
FIG. 24 is a flowchart of music staves setting submodule 331.

FIG. 24 is the flowchart of music staves setting submodule 331. Among others, the commands which come from decoding processing module 314 will set display layer 1 on display screen at step 01. Step 02 will perform line-drawing for staff sheet setting, the staff sheet remaining in a display layer which is different from the layer of music notes, so that the music notes can be easily modified. Step 03 will set display layer 2 for the display screen. Step 04 will input the arrows, marks and symbols as input characters and perform the position control. And so, the setting is directly performed and the results are displayed on the monitor. Step 05 will set the notes and meter notes (wide vertical bar). Step 06 will perform accolade note setting and text registering for the characters and commands inputted from steps 04–09 at step 07. Step 08 will perform modifying processing for page layout, and so, the music staves setting processing is achieved. The move, copy, zoom-in and zoom-out functions in editing module 302 can also be used to operate and modify the music staves setting conveniently.

Figure 25:
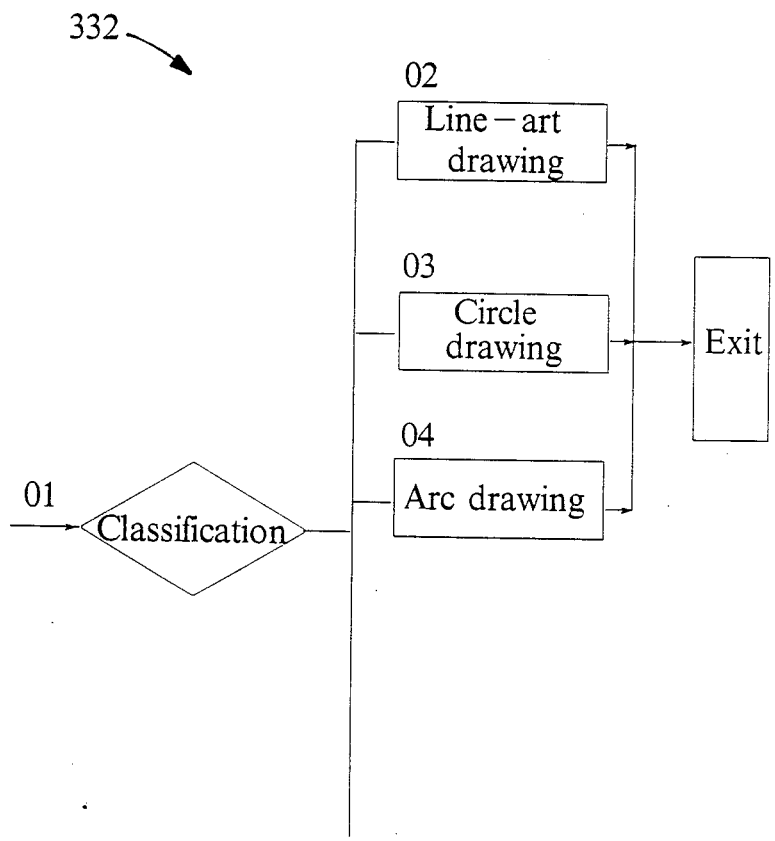
FIG. 25 is a flowchart of line-graphic submodule 332.

FIG. 25 is the flowchart of the line-drawing graphic submodule 332. Step 01 will classify the commands. Step 02 will perform the line-drawing processing and the procedure is as follows: the operator will assign a position (X1, Y1) and a position (X,Y). A straight line will be displayed from the position (X1, Y1) to the position (X,Y). As long as the operator moves the mouse, the position (X,Y) is changed, the previous line is eliminated and new one is produced between the position (X1, Y1) and the position (X,Y). A straight line starting from (X1, Y1) with any direction and any length can be obtained. Step 03 will perform circle-drawing. Step 04 will perform curve-drawing. The procedure is similar to line-drawing.

Figure 26:
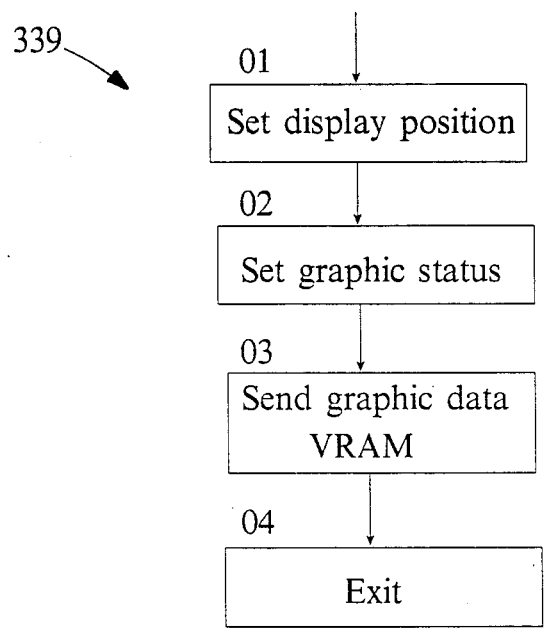
FIG. 26 is a flowchart of halftone graphic display submodule 339.

FIG. 26 is the flowchart of halftone graphic display submodule 339. Herein, step 01 represents that the operator will set display position. Step 02 will set the status of display layer and the like, and sequentially send displayed graphics and texts to graphic display buffer (VRAM), then the graphics are displayed on the monitor.

Figure 27:
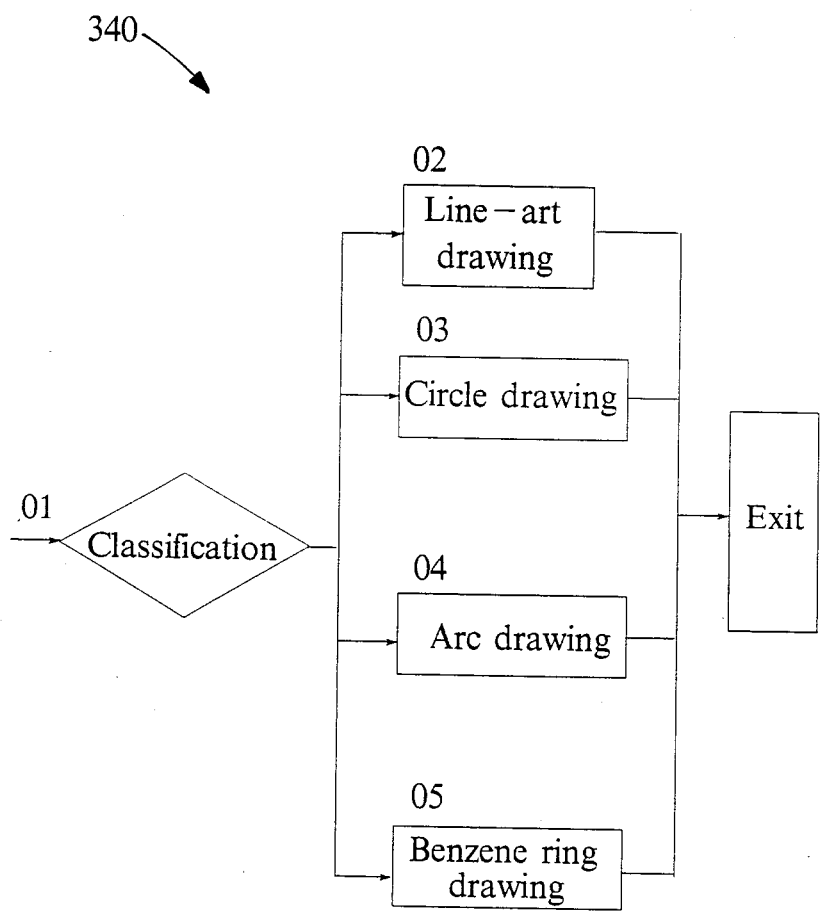
FIG. 27 is a flowchart of line graphic display submodule 340.

FIG. 27 is the flowchart of line-drawing submodule 340. Herein, the characters or commands are classified at step 01 first, then step 02 will perform a line-drawing graphic calculation and send the calculated results to the graphic display buffer for display. Step 03 will perform drawing functions for circles. Step 04 will perform drawing functions for arcs. Step 05 will perform drawing functions for a benzene ring.

Figure 28:
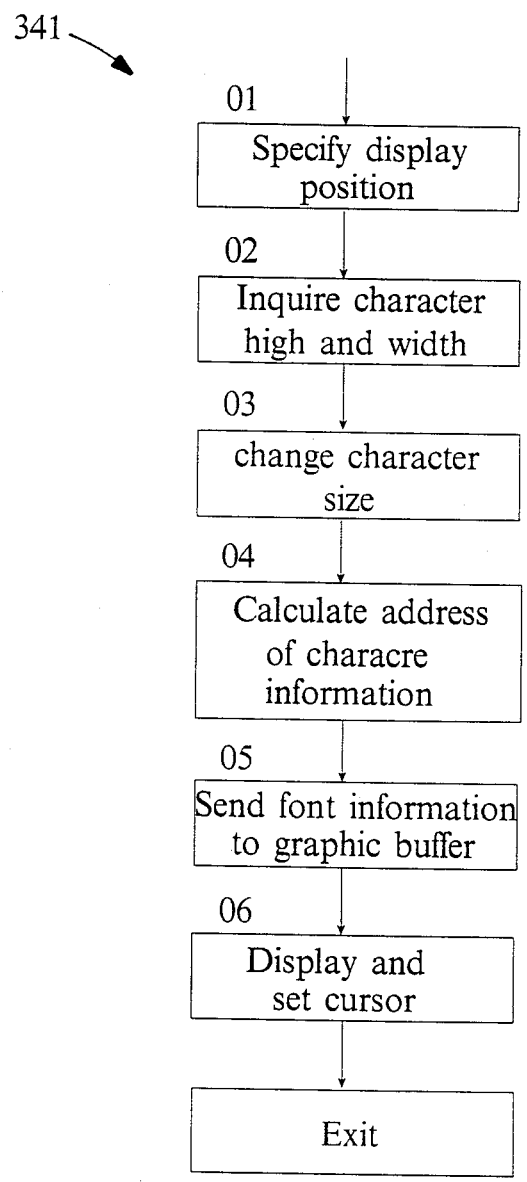
FIG. 28 is a flowchart of English character display submodule 341.

FIG. 28 is a flowchart of English character display submodule 341. Herein, step 01 will assign display position for a character. Step 02 will inquire the height, size, style, width, and the height of the baseline of the character from the setting rule library. Step 03 will change the character size (extracting lines for zoom-out and adding lines for zoom-in) and character shape (squat-shaped or thin-shaped). Step 04 will calculate the beginning of display position according to the baseline. Step 05 will send the character information (128×128 dot matrix, expressed by the vector of the serial 0's and 1's), to the graphic display buffer (VRAM), and the character is thus displayed on the monitor. Step 07 will set the cursor position according to the width of the character.

Figure 29:
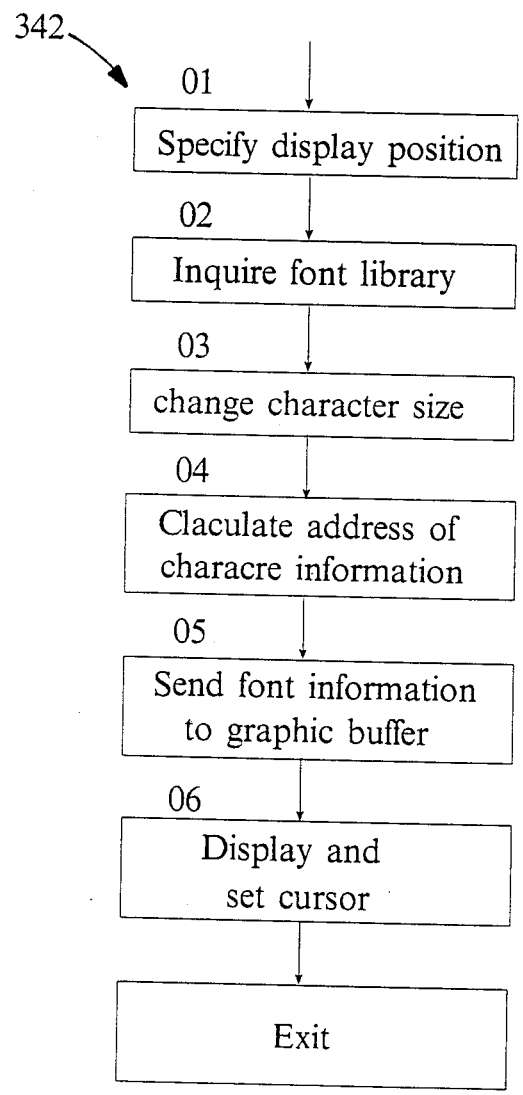
FIG. 29 is a flowchart of Chinese character display submodule 342.

FIG. 29 is the flowchart of Chinese character display submodule 342. Herein, the display position will be specified at step 01, and step 02 will inquire the character library and retrieve the characters (24×24 dot matrix, 3 bytes in width, and 24 rows). Step 03 will change the character size according to the specified size (extracting lines for zoom-out and adding lines for zoom-in). Step 04 will calculate the starting point in accordance with the current position. Step 05 will send the information of the character style to the graphic display buffer, and characters are then displayed. Step 07 will set the cursor position according to the width of the Chinese character.

Figure 30:
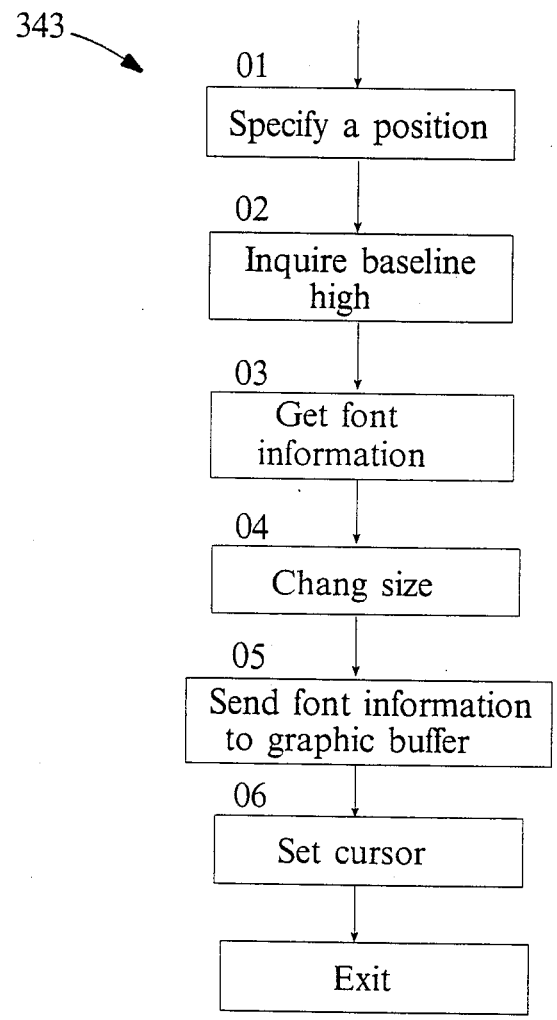
FIG. 30 is a flowchart of mathematical symbol display submodule 343.

FIG. 30 is the flowchart of mathematical symbol display submodule 343. Herein, step 01 will assign the display position. Step 02 will inquire special character double space character style, height and special baseline position. Step 03 will retrieve the font data (128×128 dot matrix, expressed with vectors of serial 0's and 1's), from the character library. Step 04 will change the character size according to the specified size (extracting lines from zoom-out and adding lines for zoom-in). Step 05 will send the font information to the graphic display buffer, and the mathematical symbol is then displayed immediately. Step 06 will set the cursor position.

Figure 31:
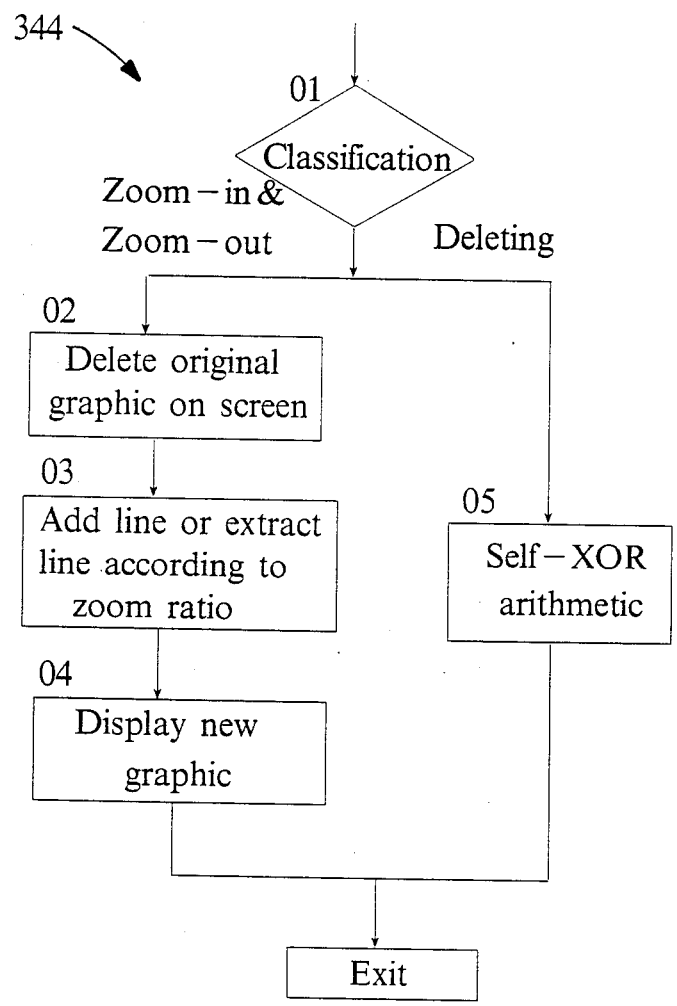
FIG. 31 is a flowchart of graphic processing submodule 344 for delete and zoom function.

FIG. 31 is the flowchart of graphic deleting, zoom-in and -out processing submodule 344. Herein, step 01 will classify the commands coming from decoding processing module 314. If it is a delete operation, the original graphic will be retrieved from the graphic display buffer and calculated with itself with an XOR operation and sent back to the buffer, and the original graphic will be deleted. When zoom-in and zoom-out operations are performed, the original graph displayed on the original screen is removed with deleting method at step 02. Step 03 will modify the graphic data with the method of extracting lines or adding lines for zoom-out or zoom-in, respectively, according to the proportion. Then step 04 will send it back to the graphic display buffer and display the graphic required.

Figure 32:
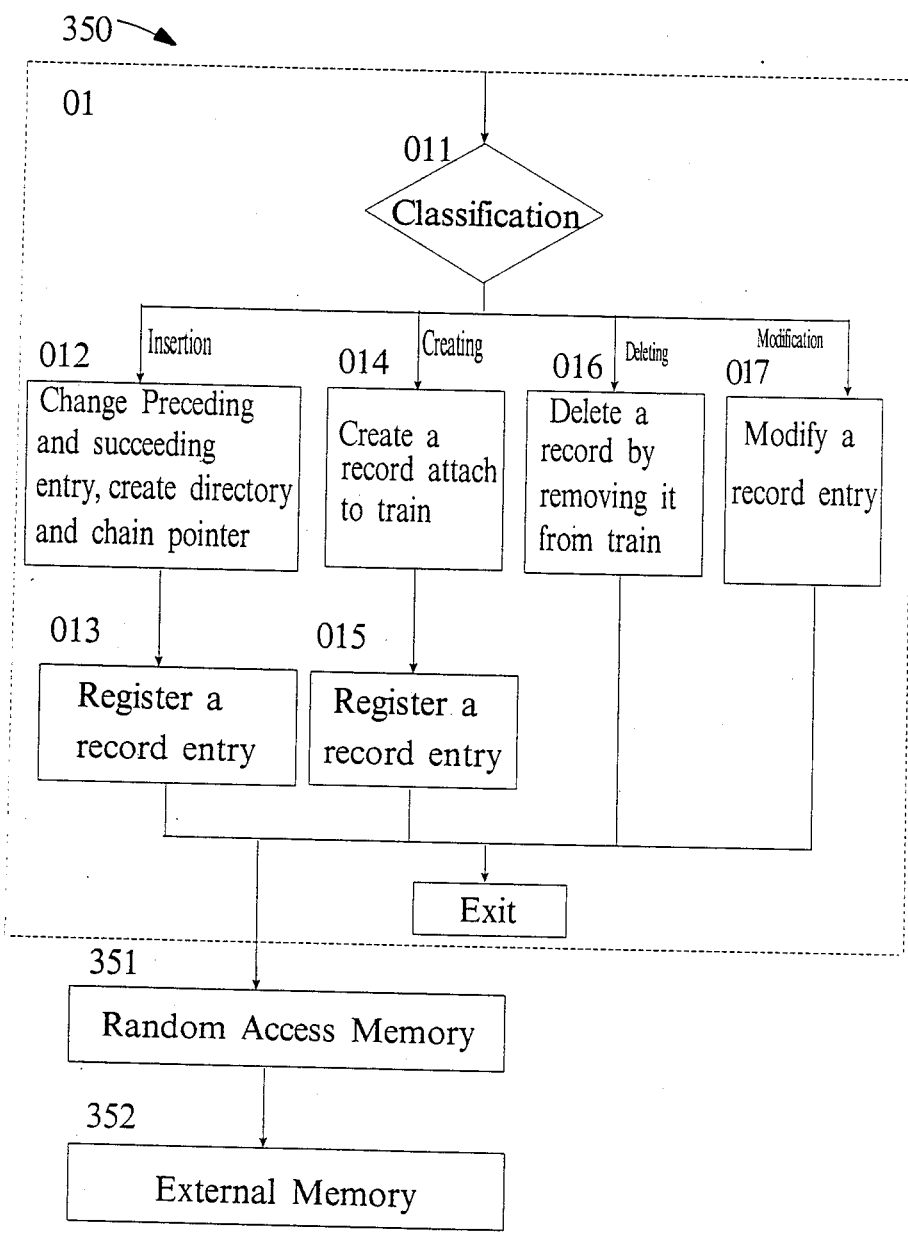
FIG. 32 is an illustrative diagram showing the structure of the file name registration, according to the present invention.

FIG. 32 is the demonstration of the named file structure stated in FIG. 6. The detailed operation of block 350 in FIG. 6 follows: Classification is achieved at step 011. The record entry is established at step 014. i.e.. rear pointer of the train will point at the new record entry and step 015 will register record entry to the exit. Step 012 inserts a new entry before a record entry. Step 013 registers new record entry to the exit. Step 016 will perform deleting operation, i.e., a record is removed from the chain. Step 017 will perform changing record operation, filling in the new contents directly. All of the operating results will be saved in RAM 351 at first, and the operator will make a decision whether to save them in peripheral storage 352.

Figure 33:
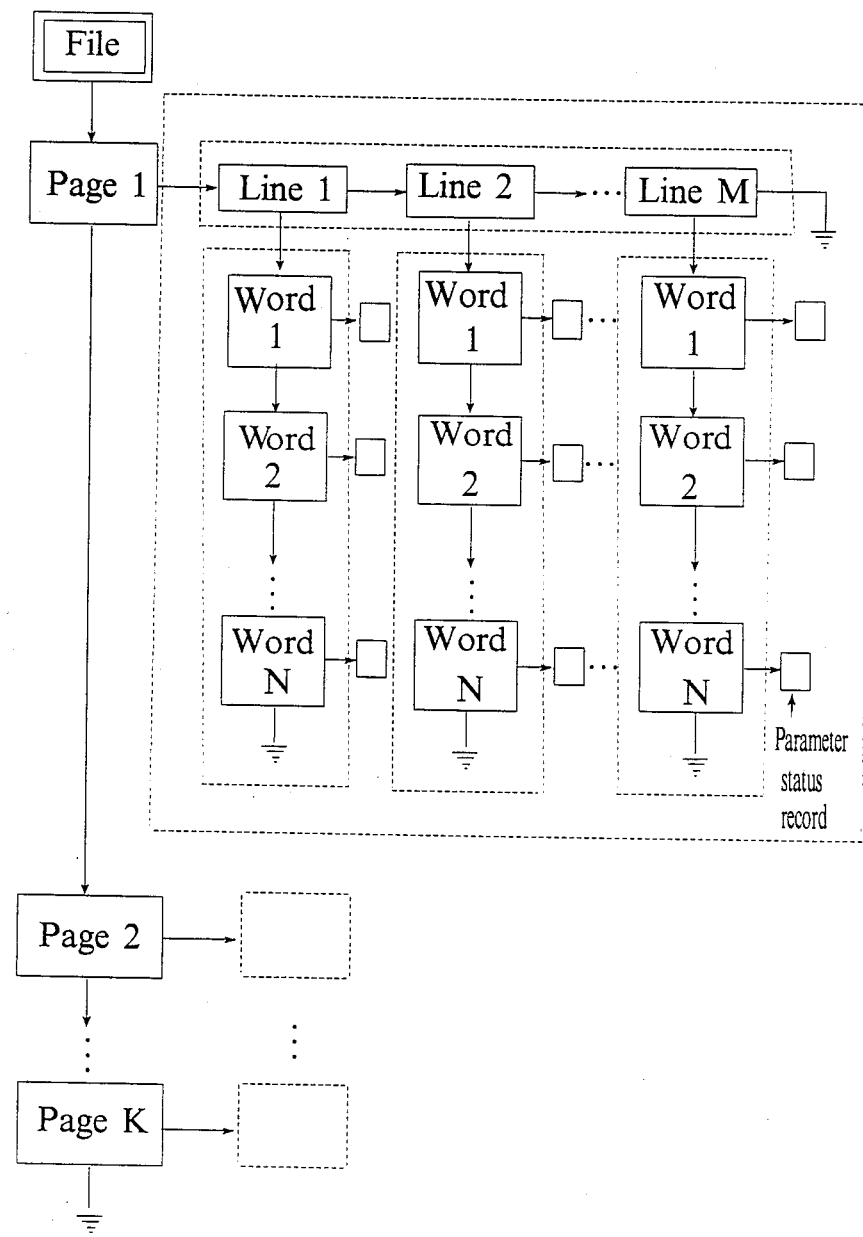
FIG. 33 shows the format of the file name adopted in the present invention.

FIG. 33 is the named file format of the present invention. Herein, a file consists of several pages; every page consists of several lines; every line consists of several characters; every character consists of 16 attributes and 10 page parameters. These attributes and page parameters are as follows:

The attributes comprise:
0. Permitting equal blank.
1. Chinese/Japanese/regular pictograph.
2. English/Russian/numerical string.
3. Full-angle punctuation.
4. Half-angle punctuation.

5. The first character of word string.
6. The last character of word string.
7. The previous character is English.
8. The previous character is Chinese.
9. Color.
10. May or may not be separated with the preceding character.
11. May or may not be separated with the succeeding character.
12. May or may not be positioned at the beginning of a line.
13. May or may not be positioned at the end of a line.
14 Start-of-line character.
15. End-of-line character.

The page parameters comprise:

Type, character style, character size, self-width, across-width, height, X,Y code, and pointer.

According to the present invention, a driving module can also be designed. Its task is to produce output with different qualities, but with the same page layout by using output devices with different resolutions, e.g., display screen, 24 pin printer, laser printer, and laser typesetter. Thus, the different costs and qualities can meet the different requirements for different users.

Its operating procedure follows: Loading the driving module into the computer if the driving module is not saved in the computer; then the computer runs the driven module to read composed text, which could be stored in internal memory or external memory, e.g., magnetic disk or magnetic tape, according to the present invention. The composed text will be converted to corresponding character control command format which is suitable for different output devices. The output is produced by output device under the control of the computer.

While embodiments and applications of this invention have been shown and described, it would be apparent to those skilled in the art that many more modifications are possible without departing from the inventive concepts herein. The invention, therefore, is not to be restricted except in the spirit and scope of the appended claims.

What is claimed is:

1. A computerized editing and composing system, comprising:
    input means for inputting characters and commands;
    computer means for controlling the operation of said system in response to commands from said input means;
    display means for displaying the result of editing and composing in real-time under control of said computer means;
    character generating means and character library means for providing said editing and composing system with characters;
    editing and composing processing means for receiving characters and commands inputted by said input means, and for editing and composing received characters as required by the input commands under the support of said character generating system and character library and control of said computer means;
    said editing and composing processing means further comprising:
        input module means for decoding characters and commands inputted from said input means;
        display module means for retrieving characters from said character generating system and character library and displaying them in accordance with the output of said input module means;
        editing module means for performing editing operations on the contents displayed inn said display module means under control of decoded commands from said input module means and according to the result of that operation, thereby performing concurrent registration, deflection, and modification;
    setting module means for carrying out real-time setting processing of characters and graphics inputted from said input means under control of decoded commands from said input module means and the support of a setting rule library connected to a setting module means;
    composing module means for performing a composing operation on characters and graphic inputted with said input means under control of decoded commands from said input module and the support of said setting rule library, and according to the result of the operation, performing concurrent registration, deletion, and modification; and
    driving means, connected to said setting means, for converting the results processed by said editing and composing processing means in accordance with the requirements of different peripheral equipment, and sending them to respective peripheral equipment and generating output of different resolutions under the control of the internal controller of different peripheral equipment.

2. A computerized editing and composing system as in claim 1, wherein said input module means further comprises:
    graphic input submodule means for digitizing said graphic information inputted with said input means;
    character input submodule means for selecting input methods for the characters;
    position input submodule means for receiving commands controlling the positions of characters and graphics inputted with said input means;
    controlling command input submodule means for receiving editing, composing or displaying commands inputted from said input means; and
    decoding processing module means for receiving and decoding the output of said submodule means.

3. A computerized editing and composing system as in claim 2, said composing module means further comprising:
    a plurality of operating submodule means for performing operations of graphic composing, moving, copying, deleting and inserting, as well as changing the styles and sizes of characters in response to the decoded commands of said decoding processing module means; and
    a plurality of text processing submodule means for performing synchronously the operations of text registration, deletion and modification in response to the operation results from one of said operating submodule means.

4. A computerized editing and composing system as in claim 2, wherein said setting module means further comprises:
    a plurality of setting submodule means for performing operations of scientific formulas, text page, halftone graphics, chemical structural formulas, music staves and line-drawing as well as graphic drawing, as required by the operator in response to the decoded commands of said decoding processing module means; and a plurality of setting text processing submodule means for performing concurrent operations of text registration, deletion, and modification in response to the results of one of said setting submodule means.

5. A computerized editing and composing system as in claim 4, wherein said text processing submodule means and setting text processing submodule means in said composing module means and said setting module means comprise respectively: a RAM means for storing the operational results of the registration, deletion and modification of text records.

6. A computerized editing and composing system as in claim 1, wherein said display means further comprises:

halftone graphic display submodule means for sending graphic information to a graphic display buffer for displaying;

line-art graphic display submodule means for carrying out calculation of line-art and sending the resulting calculated data into the graphic display buffer;

English character display submodule means for designating the display positions of characters and inquiring the state of concerned characters from said character generating system and character library, and then sending pattern information to the graphic display buffer;

Chinese character display submodule mean for determining the display position and inquiring the styles of characters from said character library and sending pattern information to the graphic display buffer; and graphic deletion and zoom-in and zoom-out submodule means for retrieving original graphics from the graphic display buffer for operations that include logical operation, reducing and enlarging proportionally the original graphics, and sending the results to the graphic display buffer.

7. A computerized editing and comprising method, comprising the steps of:

inputting characters and commands via an input means;

decoding inputted characters and commands by an editing and composing processing means;

editing, composing and displaying said characters under the control of said decoded commands;

registering, deleting and modifying text records and storing those operational results in accordance with the results of editing and composing operation;

displaying the results obtained from said editing and composing processing means in real-time; and setting scientific formulas through said input means as follows:

inputting a front-segment setting command for scientific formulas via said input means;

inputting a switching command via said input means; and inputting a rear-segment setting command for the scientific formulas via said input means.

8. A computerized editing and composing method as in claim 7, further comprising the steps of:

inputting a plurality of front-segment setting commands for scientific formulas via said input means;

inputting a plurality of switching commands with said input means; and inputting a plurality of rear-segment setting commands for scientific formulas with said input means.

9. A computerized editing and composing method as in claim 8, comprising the steps of:

inputting characters with said input means after certain front-segment setting commands have been inputted; and inputting characters with said input means after the switching commands having been inputted.

10. A computerized editing and composing method as in claim 7, comprising the steps of:

inputting characters with said input means after certain front-segment setting commands have been inputted; and inputting characters with said input means after the switching commands having been inputted.

11. A computerized editing and composing method, comprising the steps of:

inputting characters and commands via an input means;

decoding inputted characters and commands by an editing and composing processing means;

editing, composing and displaying said characters under the control of said decoded commands;

registering, deleting and modifying text records and storing those operational results in accordance with the results of editing and composing operation;

displaying the results obtained from aid editing and composing processing means in real-time; and displaying the graphics and characters respectively in different graphic layers.

12. A computerized editing and composing method as in claim 11, further comprising the steps of:

processing music staves on one graphic layer; and processing music notes and marks, etc., on another graphic layer.

13. A computerized editing and composing method, comprising the steps of:

inputting characters and commands via an input means;

decoding inputted characters and commands by an editing and composing processing means;

editing, composing and displaying said characters under the control of said decoded commands;

registering, deleting and modifying text records and storing those operational results in accordance with the results of editing and composing operation;

displaying the results obtained from said editing and composing processing means in real-time; and retrieving graphics and characters from a graphic display buffer and performing logical operations with the original graphics and characters, thereby eliminating undesired cross overlapped graphics and characters.

14. A computerized editing and composing method, comprising the steps of:

inputting characters and commands via an input means;

decoding inputted characters and commands by an editing and composing processing means;

editing, composing and displaying said characters under the control of said decoded commands;

registering, deleting and modifying text records and storing those operational results in accordance with the results of editing and composing operation;

displaying the results obtained from said editing and composing processing means in real-time; and storing the names of graphics in file headers and having the graphics to be processed as text.

15. A computerized editing and composing method, comprising the steps of:

inputting characters and commands via an input means;

decoding inputted characters and commands by an editing and composing processing means;

editing, composing and displaying said characters under the control of said decoded commands;

registering, deleting and modifying text records and storing those operational results in accordance with the results of editing and composing operation;

displaying the results obtained from said editing and composing processing means in real-time; and further including editing and composing the object to be processed using characters or graphics as required.

16. A computerized editing and composing method, comprising the steps of:

inputting characters and commands via an input means;

decoding inputted characters and commands by an editing and composing processing means;

editing, composing and displaying said characters under the control of said decoded commands;

registering, deleting and modifying text records and storing those operational results in accordance with the results of editing and composing operation;

displaying the results obtained from said editing and composing processing means in real-time; and for composing chemical structural formulas:

designating a start position 1 in a graphic operation interface;

inputting position 2 through said input means; and forming a hexagonal benzene ring in accordance with said positions 1 and 2 with consideration of at 120° internal angles of said benzene ring.

17. A computerized editing and composing method as in claim 16, further comprising the steps of:

changing position 2 by means of said input means with reference to position 1 so as to change the shape and size of said benzene ring; and eliminating the previous graphic of the benzene ring, and generating a new graphic of the benzene ring in accordance with the current position.

* * * * *